(12) United States Patent
Zhang

(10) Patent No.: US 7,116,819 B2
(45) Date of Patent: *Oct. 3, 2006

(54) IMAGE PROCESSING APPARATUS

(75) Inventor: Xiaomang Zhang, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 944 days.

This patent is subject to a terminal disclaimer.

(21) Appl. No.: 09/935,677

(22) Filed: Aug. 24, 2001

(65) Prior Publication Data

US 2002/0039142 A1 Apr. 4, 2002

(30) Foreign Application Priority Data

Aug. 25, 2000 (JP) .............................. 2000-256515

(51) Int. Cl.
G06K 9/00 (2006.01)
G03F 3/08 (2006.01)

(52) U.S. Cl. ..................... 382/162; 382/167; 358/518

(58) Field of Classification Search ........ 382/162–169, 382/260, 262, 263, 264; 348/241–242, 27; 358/501, 512, 518, 519, 520
See application file for complete search history.

(56) References Cited

U.S. PATENT DOCUMENTS

| 4,605,956 A | 8/1986 | Cok | 358/44 |
| 4,630,307 A | 12/1986 | Cok | 382/25 |
| 4,642,678 A | 2/1987 | Cok | 358/44 |

FOREIGN PATENT DOCUMENTS

| JP | 63-205238 A | 8/1988 |
| JP | 3-88478 A | 4/1991 |
| JP | 05-191809 A | 7/1993 |
| JP | A10 164371 | 6/1998 |
| JP | 10-187965 A | 7/1998 |
| JP | A1 118047 | 1/1999 |
| JP | 2000-149008 A | 5/2000 |

OTHER PUBLICATIONS

Adams, SPIE, vol. 2416, pp. 144-151.

*Primary Examiner*—Duy Dang
(74) *Attorney, Agent, or Firm*—Birch, Stewart, Kolasch & Birch, LLP

(57) ABSTRACT

An image processing apparatus for processing RGB image data output from an image capturing element including a primary-color filter, includes: a middle-high range luminance component compensation section for compensating for a middle-high range luminance component of a low-frequency luminance signal generated based on the RGB image data such that the low-frequency luminance signal has substantially an ideal frequency luminance characteristic which is lower than or equal to a predetermined frequency.

20 Claims, 20 Drawing Sheets

FIG.2A

| x / y | 1/16 | -3/16 | 10/16 | 10/16 | -3/16 | 1/16 |
|---|---|---|---|---|---|---|
| 1/16 | 1/256 | -3/256 | 10/256 | 10/256 | -3/256 | 1/256 |
| -3/16 | -3/256 | 9/256 | -30/256 | -30/256 | 9/256 | -3/256 |
| 10/16 | 10/256 | -30/256 | 100/256 | 100/256 | -30/256 | 10/256 |
| 10/16 | 10/256 | -30/256 | 100/256 | 100/256 | -30/256 | 10/256 |
| -3/16 | -3/256 | 9/256 | -30/256 | -30/256 | 9/256 | -3/256 |
| 1/16 | 1/256 | -3/256 | 10/256 | 10/256 | -3/256 | 1/256 |

First YH extraction filter F1

FIG.2B

| x / y | 1/8 | 3/8 | 3/8 | 1/8 |
|---|---|---|---|---|
| 1/8 | 1/64 | 3/64 | 3/64 | 1/64 |
| 3/8 | 3/64 | 9/64 | 9/64 | 3/64 |
| 3/8 | 3/64 | 9/64 | 9/64 | 3/64 |
| 1/8 | 1/64 | 3/64 | 3/64 | 1/64 |

Second YH extraction filter F2

FIG.5A

| y \ x | 1/4 | 3/4 | 3/4 | 1/4 |
|---|---|---|---|---|
| 1/4 | 1/16 | 3/16 | 3/16 | 1/16 |
| 3/4 | 3/16 | 9/16 | 9/16 | 3/16 |
| 3/4 | 3/16 | 9/16 | 9/16 | 3/16 |
| 1/4 | 1/16 | 3/16 | 3/16 | 1/16 |

RB-interpolation filter

FIG.5B

| y \ x | 1/4 | 3/4 | 3/4 | 1/4 |
|---|---|---|---|---|
| 1/8 | 1/32 | 3/32 | 3/32 | 1/32 |
| 3/8 | 3/32 | 9/32 | 9/32 | 3/32 |
| 3/8 | 3/32 | 9/32 | 9/32 | 3/32 |
| 1/8 | 1/32 | 3/32 | 3/32 | 1/32 |

G-interpolation filter
(Operation in x-direction has priority over operation in y-direction)

FIG.6

| -1 | 1 | 1 | -1 |   (A)

| -1 | 2 | -1 |   (B)

| -1 | 0 | 2 | 0 | -1 |   (C)

| -2 | 1 | 2 | 1 | -2 |   (D)

| -1 | -1 | 4 | -1 | -1 |   (E)

| 1 | -5 | 4 | 4 | -5 | 1 |   (F)

| 1 | 3 | 3 | 1 |   (G)

One-dimensional filter

FIG.22

| 1/256 | −3/256 | 10/256 | 10/256 | −3/256 | 1/256 |
|---|---|---|---|---|---|
| −3/256 | 5/256 | −42/256 | −42/256 | 5/256 | −3/256 |
| 10/256 | −42/256 | 64/256 | 64/256 | −42/256 | 10/256 |
| 10/256 | −42/256 | 64/256 | 64/256 | −42/256 | 10/256 |
| −3/256 | 5/256 | −42/256 | −42/256 | 5/256 | −3/256 |
| 1/256 | −3/256 | 10/256 | 10/256 | −3/256 | 1/256 |

IMAGE PROCESSING APPARATUS

BACKGROUND OF THE INVENTION

1. Field of the Invention

The present invention relates to an image processing apparatus for processing image data obtained by a CCD (charge-coupled device) area sensor having a primary-color filter so as to obtain a high quality image. Such an image processing apparatus is mounted on a digital camera (e.g., electronic still camera) or the like.

2. Description of the Related Art

A conventional image processing apparatus for use in a digital camera, or the like, performs a series of various image processing steps, e.g., interpolation for each color component, contour emphasizing processing, etc., on image data obtained by a CCD area sensor having a primary-color filter, so as to obtain a high quality image. Hereinafter, conventional image processing apparatuses are described with reference to FIGS. 13 through 21.

FIG. 13 is a block diagram showing a first exemplary structure of a conventional image processing apparatus. In FIG. 13, the image processing apparatus 100 includes an optical low-pass filter 101, a primary-color CCD area sensor 102, a RGB interpolation section 103, a white balance adjustment section 104, a gamma correction section 105, and a sharpening processing section (contour emphasizing section) 106.

The low-pass filter 101 removes frequency components whose frequency is equal to or higher than a ½ of sampling frequency fs. According to the sampling theorem, when an image is converted into image data, frequency components whose frequency is equal to or higher than a ½ of sampling frequency fs are converted into aliasing noise. In order to reduce such aliasing noise, the optical low-pass filter 101 is provided before the CCD area sensor 102.

The primary-color CCD area sensor 102 is formed by a plurality of light-receiving elements arranged in a matrix. The primary-color CCD area sensor 102 includes a primary-color (R, G, B) filter on a light-receiving face thereof where each of color areas corresponds to one pixel. The color filter is formed based on the Bayer array (FIG. 14) which is a type of RGB arrangements.

The RGB interpolation section 103 (which will be described later in detail) can receive, from the CCD area sensor 102, only one type of color component for each pixel among R, G, B colors of the color filter of the sensor 102. In the RGB interpolation section 103, each of the remaining two types of color components in each pixel is calculated from color components of the same type in neighboring pixels, whereby all of the three color components are obtained in each pixel.

The white balance adjustment section 104 adjusts the white balance with respect to the R-, G-, and B-components in each pixel which are obtained by the RGB interpolation section 103 according to the color temperature of light so as to correct the color of an image.

The gamma correction section 105 processes the R-, G-, and B-components obtained after the white balance has been adjusted such that the R-, G-, and B-components conform to properties of a display or printer which outputs an image.

The sharpening processing section 106 performs contour emphasizing processing (sharpening processing) in order to obtain a sharp image. The sharpening process compensates for high-range luminance components which have been removed by the low-pass filter 101 by filtering processing which emphasizes high-range luminance components. That is, in the case where the low-pass filter 101 is provided, CCD image data generated by the primary-color CCD area sensor 102 has a reduced high-range luminance component. Furthermore, for example, since an unobtained color component in each pixel is compensated for by interpolation, e.g., by calculating an average value from color components of the same type in neighboring pixels, an image obtained by such interpolation has a further reduced high-range luminance component. Thus, in order to obtain a sharp image, it is necessary to compensate for a lost high-range luminance component by performing a filtering process which emphasizes high-range luminance components.

Interpolation by the RGB interpolation section 103 is now described in detail.

When the CCD area sensor 102 is a single-plate area sensor, in the RGB interpolation section 103, interpolation is performed for the missing two types of color components such that all of R(red)-, G(green)-, and B(blue)-color components are complete in each pixel. Based on all of R-, G-, and B- color components including color components obtained by interpolation, a color image is created.

When the CCD area sensor 102 is a three-plate area sensor where three area sensor elements are provided with full-size R-, G-, and B-color filters, respectively, the RGB interpolation section 103 receives from the CCD area sensor 102 all of R-, G-, and B-color components for each pixel. Thus, it is not necessary to perform interpolation. However, when the CCD area sensor 102 is a single-plate area sensor having, on its light-receiving element, a single color filter on which R-, G-, and B-filter areas are arranged in a predetermined pattern (e.g., Bayer array shown in FIG. 14), it is necessary to perform interpolation for missing color components in each pixel. Therefore, when employing a single-plate CCD camera incorporating a single-plate CCD area sensor, missing color components in each pixel which cannot be obtained by a color filter are created by various methods.

U.S. Pat. Nos. 4,605,956, 4,642,678, and 4,630,307, and the document by James E. Adams, Jr., "Interactions between color plane interpolation and other image processing functions in electronic photography", suggest various interpolation methods for the purpose of creating an image with no jaggy or zip noise. "Jaggy" means a step-shaped noise which emerges along a contour of an image, which is a type of noise among various types of noise.

In U.S. Pat. No. 4,605,956, interpolation is performed by using the following expressions (1) through (4) on missing color components in a pixel arrangement shown in FIG. 15 (bilinear interpolation method). Interpolation for G- and B-components at each pixel position in FIGS. 14 and 15 is shown below:

$$G5=(G2+G4+G6+G8)/4 \qquad (1)$$

$$B5=(B1+B3+B7+B9)/4 \qquad (2)$$

$$B2=(B1+B3)/2 \qquad (3)$$

$$B4=(B1+B7)/2 \qquad (4)$$

In the Bayer array shown in FIG. 15, R-, G-, and B-colors are arranged according to a certain pattern. For example, at a central pixel position, R5, color components G5 and B5 are missing in a corresponding color filter. The color components G5 and B5 are obtained from expressions (1) and (2).

Furthermore, B2 is obtained from expression (3), and B4 is obtained from expression (4). Interpolation for each of B6 and B8 is performed by obtaining an average value of B-component values in vertically or horizontally neighboring pixels based on an expression similar to expression (3) or (4). This is the same for R2, R4, R6, and R8.

Furthermore, G1 is obtained from G-component information in neighboring pixels around pixel position "B1" by an expression similar to expression (1). This is the same for G3, G7, and G9. R1 is obtained from R-component information in neighboring pixels around pixel position "B1" by an expression similar to expression (2). This is the same for R3, R7, and R9.

Next, an image processing method disclosed in Japanese Laid-Open Publication No. 10-164371 is described with reference to FIG. 16.

FIG. 16 is a block diagram showing a second exemplary structure of a conventional image processing apparatus. As shown in FIG. 16, the image processing apparatus 200 includes a primary-color CCD area sensor 201, a RGB interpolation section 202, and a contour emphasizing sections 203 provided for respective ones of R-, G-, and B-components.

The RGB interpolation section 202 first interpolates a G-component by using expression (5) which represents median processing for G-color components obtained by the filter arrangement shown in FIG. 15. Then, only at pixel positions, "R" and "B", in FIG. 14, a (R-G) component and a (B-G) component are created. In the last, the created (R-G) and (B-G) components are interpolated by bilinear interpolation, and G-components are added to the interpolated (R-G) and (B-G) components, whereby R- and B-components are obtained.

$$G5=(G2+G4+G6+G8-\text{Min}-\text{Max})/2 \quad (5)$$

Min=Min($G2,G4,G6,G8$)

Max=Max($G2,G4,G6,G8$)

How to obtain B4 at pixel position "G4" is now described in detail with reference to FIG. 15. In the first step, G1, G3, G5, G7, and G9 are interpolated by the median processing process using expression (5). Then, (B1−G1) and (B7−G7) which are (B-G) components at pixel positions "B1" and "B7" are created. (B4−G4) which is a (B-G) component at pixel positions "G4" is represented as follows:

$$B4-G4=(\tfrac{1}{2})\{(B1-G1)+(B7-G7)\}$$

From this expression, B4 can be represented as follows:

$$B4=(\tfrac{1}{2})\{(B1-G1)+(B7-G7)\}+G4$$

The contour emphasizing sections 203 employs a two-dimensional second-derivative filter shown in FIG. 17A for each of R-, G-, and B-components. Each box of the two-dimensional second-derivative filter shown in FIG. 17A corresponds to one pixel, and the number shown in each box represents a weight. The weight of each box area is set such that the total weight in the two-dimensional second-derivative filter is zero.

Next, an interpolation method disclosed in Japanese Laid-Open Publication No. 11-18047 is described with reference to FIG. 18.

FIG. 18 is a block diagram showing a third exemplary structure of a conventional image processing apparatus. In FIG. 18, the image processing apparatus 300 includes a primary-color CCD area sensor 301, RGB interpolation sections 302, a middle-range component emphasizing section 303, a high-range component emphasizing section 304, a white balance adjustment section 305, and a gamma correction section 306. The primary-color CCD area sensor 301 includes a color filter of Bayer array.

The RGB interpolation sections 302 perform interpolation on each of R-, G-, and B-components. When a G-component is interpolated by using a median method of expression (5), and R- and B-components are interpolated by using a bilinear method of expressions (2) through (4), interpolation is achieved with high image quality.

The middle-range component emphasizing section 303 is formed by a middle-range component extraction section 303a and adders 303b. In the middle-range component emphasizing section 303, the middle-range component extraction section 303a extracts a middle-range component from a G-component interpolated by the G-interpolation section of the RGB interpolation sections 302. The extracted middle-range component is synthesized with each of R-, G-, and B-components by the adders 303b, whereby the middle-range component emphasizing processing is achieved. In this middle-range component emphasizing processing, the difference between a G-component and a low-pass filtered G-component is added as a compensation component to the G-component. In other words, a high-range component of the G-component is removed by a low-pass filter (not shown) to obtain a GBAR-component, and a compensation component which is the difference between the G-component and the GBAR-component (G-GBAR) is added to the G-component, whereby a middle-range component emphasizing processing is achieved.

The high-range component emphasizing section 304 is formed by a high-range component extraction section 304a and adders 304b. In the high-range component emphasizing section 304, the high-range component extraction section 304a extracts a high-range component from a G-component interpolated by the G-interpolation section of the RGB interpolation sections 302. The extracted high-range component is synthesized with each of R-, G-, and B-components by the adders 304b, whereby high-range component emphasizing processing is achieved. This high-range component emphasizing process employs the two-dimensional second-derivative filter shown in FIG. 17B. In the filter shown in FIG. 17B, in order to obtain pixel data of a pixel corresponding to a central box "4", the weight of the filter is multiplied by data from each pixel, and the products for all of the pixels are added up. Thus, when a result of this calculation does not change, the sum of the products results in zero. When a result of this calculation changes much, the sum becomes a large value, whereby a high-range component is emphasized.

Now, consider a case where each of R-, G-, and B-components obtained through a Bayer array filter shown in FIG. 14 is sampled at a sampling frequency $fs=1/\Delta x=1/\Delta y$. A sampling frequency distribution range obtained in this case is shown in FIG. 19. Herein, "$\Delta x$" denotes the width of a pixel (pixel pitch) in a horizontal direction (x-direction), and "$\Delta y$" denotes the width of a pixel (pixel pitch) in a vertical direction (y-direction).

According to the sampling theorem, a highest restorable frequency within a spatial frequency band of an original image is represented by a solid-line lozenge which is indicated by an arrow "G-component" in FIG. 19. Furthermore, R- and B-components are included in a two-dot chain line square. Thus, a frequency band which can be accurately converted into R-, G-, and B-components of image data is an area within the square defined by the two-dot chain line. As seen from FIG. 19, the accurately-restorable, highest frequency of the original image is a half of the sampling frequency $fs(=1/\Delta x=1/\Delta y)$.

Therefore, a frequency component which is higher than the highest restorable frequency fs/2 emerges as a noise in the image data.

In general, for the purpose of avoiding such a problem, an optical low-pass filter (anti-aliasing filter) is provided to a CCD area sensor. This low-pass filter removes frequency components of image data which are higher than the highest restorable frequency fs/2, but undesirably attenuates some of frequency components which are lower than the highest restorable frequency fs/2 because the low-pass filter is not ideal. In FIG. 20, graph a shows an ideal low-pass filter frequency characteristic (i.e., only frequency components which are higher than the highest restorable frequency fs/2 are removed). However, in an actual case, the low-pass filter frequency characteristic results in a curve of graph b. Furthermore, graph a shows an ideal frequency characteristic of a compensation filter which is used to compensate for the characteristic of graph b so as to obtain a characteristic similar to the ideal characteristic of graph a. According to the present invention, as described later in detail, a middle-range luminance component and a high-range luminance component are synthetically added to a newly-extracted, middle-high range luminance component according to a predetermined synthetic ratio, whereby a low-pass filtered component is compensated for by using a compensation filter having a frequency characteristic similar to graph c.

Furthermore, when interpolation is performed on components of an image which have been obtained through a Bayer array filter shown in FIG. 14 so as to compensate for the missing two types of color components in each pixel, high-range luminance components are attenuated. Accordingly, it is indispensable for generating a sharp image to compensate for attenuated high-range components. In general, such a compensation is achieved by separately performing a compensation for middle-range luminance components with a compensation filter having a frequency characteristic of graph d and a compensation for high-range luminance components with a compensation filter having a frequency characteristic of graph c. In FIG. 21, graph b shows a synthetic frequency characteristic obtained after low-pass filtering (with an anti-aliasing filter) and interpolation processing, and graph a shows an ideal frequency characteristic obtained after an entire process in an image processing system including compensation processing.

In the above-described conventional art, attenuated middle- and high-range components among low-pass filtered components are compensated for by compensation filters. The middle-range components are compensated for by a compensation filter having a characteristic represented by graph d of FIG. 21, and the high-range components are compensated for by a compensation filter having a characteristic represented by graph a of FIG. 21. When graph d exhibits the maximum amplitude, the angular frequency $\omega$ is $\pi/2$ (equivalent to fs/4). When graph a exhibits the maximum amplitude, the angular frequency $\omega$ is $\pi$ (equivalent to fs/2).

However, in contour emphasizing processing which is performed for obtaining a sharp image, when high-range components of an image are emphasized by compensating for high-range components, all components having an angular frequency $\omega$ higher than fs/2 are converted into noise. Thus, as the resolution of the image is increased, noise and jaggy are observed more prominently.

For example, in the method described in connection with the first exemplary conventional structure shown in FIG. 13, a G-component which largely contributes to the luminance of an image is interpolated according to above expression (1), and image data obtained after the interpolation is subjected to contour emphasizing processing, and as a result, jaggy emerges in an edge portion of the image. Examples of proposed method for solving such a problem include a color-smoothing interpolation method (U.S. Pat. No. 4,642, 678), a pattern-recognition interpolation method (U.S. Pat. No. 4,630,307), an adaptive interpolation method (document by James E. Adams, Jr.). These methods are different interpolation methods, but all performed in a structure similar to the image processing apparatus 100 shown in FIG. 13. That is, a high-range component which is indispensable for obtaining a sharp image is generated by contour emphasizing processing in the sharpening processing section 106 which resides at the end of the entire process. These interpolation methods each have some advantages in reducing false color and jaggy. However, these interpolation methods do not have means for processing a high-range component except for high-range emphasizing filtering, and thus, noise occurs in the high-range emphasizing filtering.

Thus, in the methods described in connection with the above first through third exemplary conventional structures (FIGS. 13, 16, and 18), noise is inevitably emphasized when a high-range component is compensated for by sharpening processing. That is, during interpolation of high-range components, frequency components whose frequency is equal to or higher than $\frac{1}{2}$ of a sampling frequency fs are also emphasized, and the emphasized components whose frequency is equal to or higher than a $\frac{1}{2}$ of sampling frequency fs are observed as noise and/or jaggy.

SUMMARY OF THE INVENTION

According to one aspect of the present invention, an image processing apparatus for processing RGB image data output from an image capturing element including a primary-color filter includes: a middle-high range luminance component compensation section for compensating for a middle-high range luminance component of a low-frequency luminance signal generated based on the RGB image data such that the low-frequency luminance signal has substantially an ideal frequency luminance characteristic which is lower than or equal to a predetermined frequency.

In this specification, a "middle-high range luminance component" means a luminance component mainly containing middle-high range components, and a "low-frequency luminance signal" means a luminance signal mainly containing low-frequency components.

With the above structure, a middle-high range luminance component of a low-frequency luminance signal which is attenuated as compared with an ideal frequency characteristic in a range of a predetermined frequency (a $\frac{1}{2}$ of sampling frequency fs) or smaller is compensated. Thus, a sharp image can be obtained by contour emphasizing processing while preventing occurrence of noise and jaggy which may be caused when obtaining the sharp image.

According to another aspect of the present invention, an image processing apparatus for processing RGB image data output from an image capturing element including a primary-color filter includes: a middle-high range luminance component extraction section for extracting a middle-high range luminance component which has a zero amplitude at an angular frequency $\omega=\pi$ and a maximum amplitude at an angular frequency $\omega$ between $\pi/2$ and $\pi$ from a first luminance signal generated based on RGB image data, and a first synthesis section for adding the middle-high range luminance component to a low-frequency luminance signal generated based on the RGB image data so as to generate a second luminance signal.

With such a structure, an image with high resolution can be obtained by contour emphasizing processing while preventing occurrence of noise and jaggy which may be caused when obtaining the sharp image.

In one embodiment of the present invention, the middle-high range luminance component extraction section uses at least one filter having a size of an even-number of pixels to arithmetically process the first luminance signal.

With such a structure, a middle-high range component whose amplitude is zero when the angular frequency ω is π and has a maximum value at a position where the angular frequency ω is between π/2 to π can be readily extracted.

In another embodiment of the present invention, the filter having a size of an even-number of pixels is a two-dimensional filter and has coefficients symmetrically arranged with respect to a x-direction and a y-direction.

With such a structure, a uniform filtering effect can be obtained, and as a result, an image can be faithfully reproduced.

In still another embodiment of the present invention, the filter having a size of an even-number of pixels includes a first low-pass filter having a differentiation capability and a second low-pass filter; and a difference between an output obtained by arithmetically processing the first luminance signal using the first low-pass filter and an output obtained by arithmetically processing the first luminance signal using the second low-pass filter is output as the middle-high range luminance component.

With such a structure, arithmetic operations in x- and y-directions of image data can be separately performed, and accordingly, increases in the amount of arithmetic operations can be suppressed. Thus, YH extraction filtering can be readily implemented by hardware.

In still another embodiment of the present invention, the image processing apparatus further includes: a first interpolation section for interpolating missing components among R-, G-, and B-components for each pixel before the generation of the first luminance signal, wherein the first interpolation section interpolates missing components by arithmetically processing the RGB image data using a filter having a size of 3 pixels×3 pixels.

With such a structure, a middle-high range luminance component can be extracted while most-effectively preventing deterioration of the middle-high range luminance component.

In still another embodiment of the present invention, the image processing apparatus further includes: a second interpolation section for interpolating missing components among R-, G-, and B-components for each pixel before the generation of the low-frequency luminance signal, wherein the second interpolation section interpolates missing components by arithmetically processing the RGB image data using a filter having a size of an even-number of pixels.

With such a structure, when compensating for a middle-high range luminance component of a low-frequency luminance signal, a center of the middle-high range luminance component is present at a position between neighboring pixels, and a center of the low-frequency luminance signal is also present at a position between neighboring pixels. Thus, occurrence of a ghost in a reproduced image can be prevented.

In still another embodiment of the present invention, at least one of the first and second interpolation sections interpolates the RGB image data by using a median method for a G-component and a bilinear method for R- and B-components.

With such a structure, a G-component is interpolated by using a median method, whereby attenuation of a high-range luminance component is suppressed to a minimum level. R- and B-components are interpolated by using a bilinear method, whereby noise is reduced. Thus, a contour of an image is emphasized, and the quality of the image can be improved.

In still another embodiment of the present invention, the image processing apparatus further includes: a middle/high-range luminance component extraction section for extracting at least one of a middle-range luminance component and a high-range luminance component based on the second luminance signal; and a second synthesis section for adding at least one of the middle-range luminance component and the high-range luminance component to the second luminance signal so as to generate a third luminance signal.

In this specification, a "middle-range luminance component" means a luminance component mainly containing middle-frequency components, and a "high-range luminance component" means a luminance component mainly containing high-frequency components.

With the above structure, by changing a ratio between a middle-range luminance component and a high-range luminance component, the three-dimensional appearance (stereoscopic effect or stereophonic effect) of an image can be adjusted according to user's preference.

In still another embodiment of the present invention, wherein the middle/high-range luminance component extraction section arithmetically processes the second luminance signal by using one filter which has an adjustable coefficient.

With such a structure, a middle/high-range component extraction section can be readily formed of a single filter.

In still another embodiment of the present invention, the image processing apparatus further includes: a median filtering section for removing, with a median filter, noise inherent to the image capturing element which is contained in a color-difference signal generated based on a RGB image signal from the second interpolation section, wherein the median filtering section changes the size of the median filter according to an amount of the noise.

With such a structure, the amount of noise included in a color-difference signal varies according to, for example, the quality of an image capturing element such as a CCD. Thus, by selecting an appropriate median filter according to the amount of noise, a color-difference signal with reduced noise can be generated.

Thus, the invention described herein makes possible the advantages of providing an image processing apparatus which can prevent noise and jaggy which may occur when obtaining a sharp image.

These and other advantages of the present invention will become apparent to those skilled in the art upon reading and understanding the following detailed description with reference to the accompanying figures.

BRIEF DESCRIPTION OF THE DRAWINGS

FIGS. 2A and 2B show specific examples of YH extraction filters used in a middle-high range luminance component extraction section of the image processing apparatus shown in FIG. 1.

FIGS. 5A and 5B show RGB interpolation filters used in a second RGB interpolation section of the image processing apparatus shown in FIG. 1. FIG. 5A shows a specific example of an R- and B-interpolation filter. FIG. 5B shows a specific example of a G-interpolation filter.

FIG. 6 shows examples of one-dimensional filters in parts (A) through (G).

FIG. 22 shows a specific example of a YH extraction filter formed of a single filter which is used in a middle-high luminance component extraction section of the image processing apparatus shown in FIG. 1.

DESCRIPTION OF THE PREFERRED EMBODIMENTS

Hereinafter, an embodiment of the present invention will be described with reference to the drawings.

Figure 1:
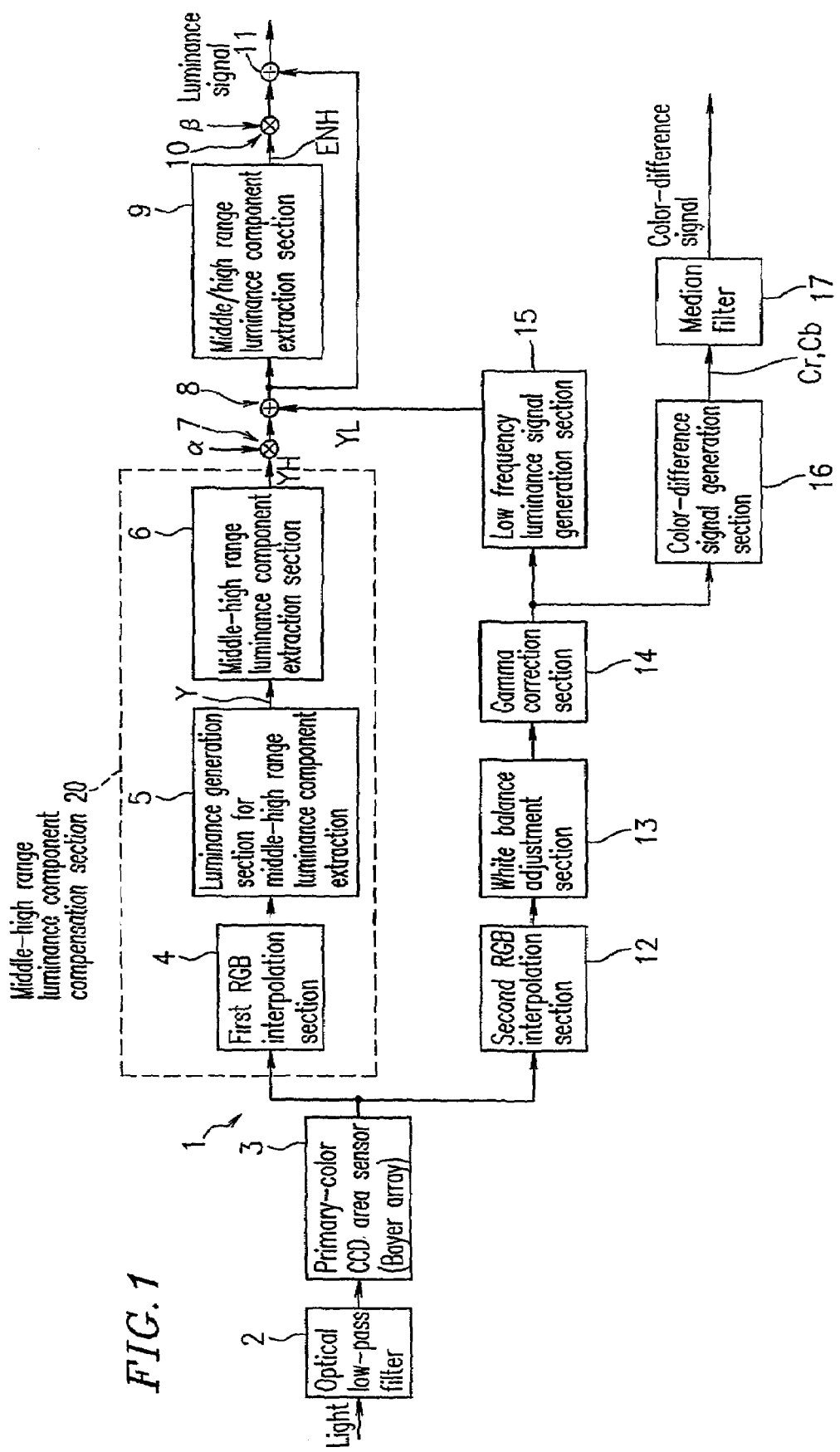
FIG. 1 is a block diagram showing a structure of an image processing apparatus according to an embodiment of the present invention.

FIG. 1 is a block diagram showing a structure of an image processing apparatus according to an embodiment of the present invention. In FIG. 1, the image processing apparatus 1 includes: an optical low-pass filter 2; a primary-color CCD area sensor 3; a first RGB interpolation section (RGB interpolation section for extraction of middle-high range luminance component) 4; a luminance generation section 5 for extraction of middle-high range luminance component; a middle-high range luminance component extraction section 6; a multiplier 7 and adder 8 which function as a first synthesizing section; a middle/high range luminance component extraction section 9; and a multiplier 10 and adder 11 which function as a second synthesizing section. The first RGB interpolation section 4, the luminance generation section 5, and the middle-high range luminance component extraction section 6 form a middle-high range luminance component compensation section 20.

The low-pass filter 2 removes frequency components whose frequency is equal to or higher than a ½ of sampling frequency fs.

Figure 14:
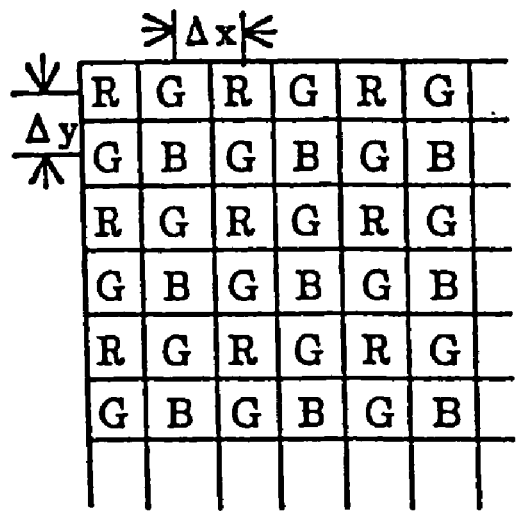
FIG. 14 is a plan view showing a Bayer-array of a color filter.
Figure 15:
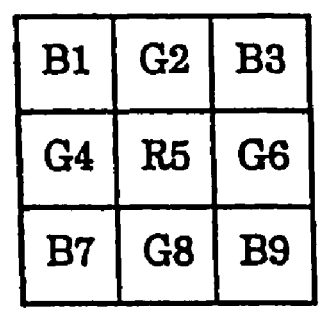
FIG. 15 shows a portion of the Bayer-array of FIG. 14.
Figure 16:
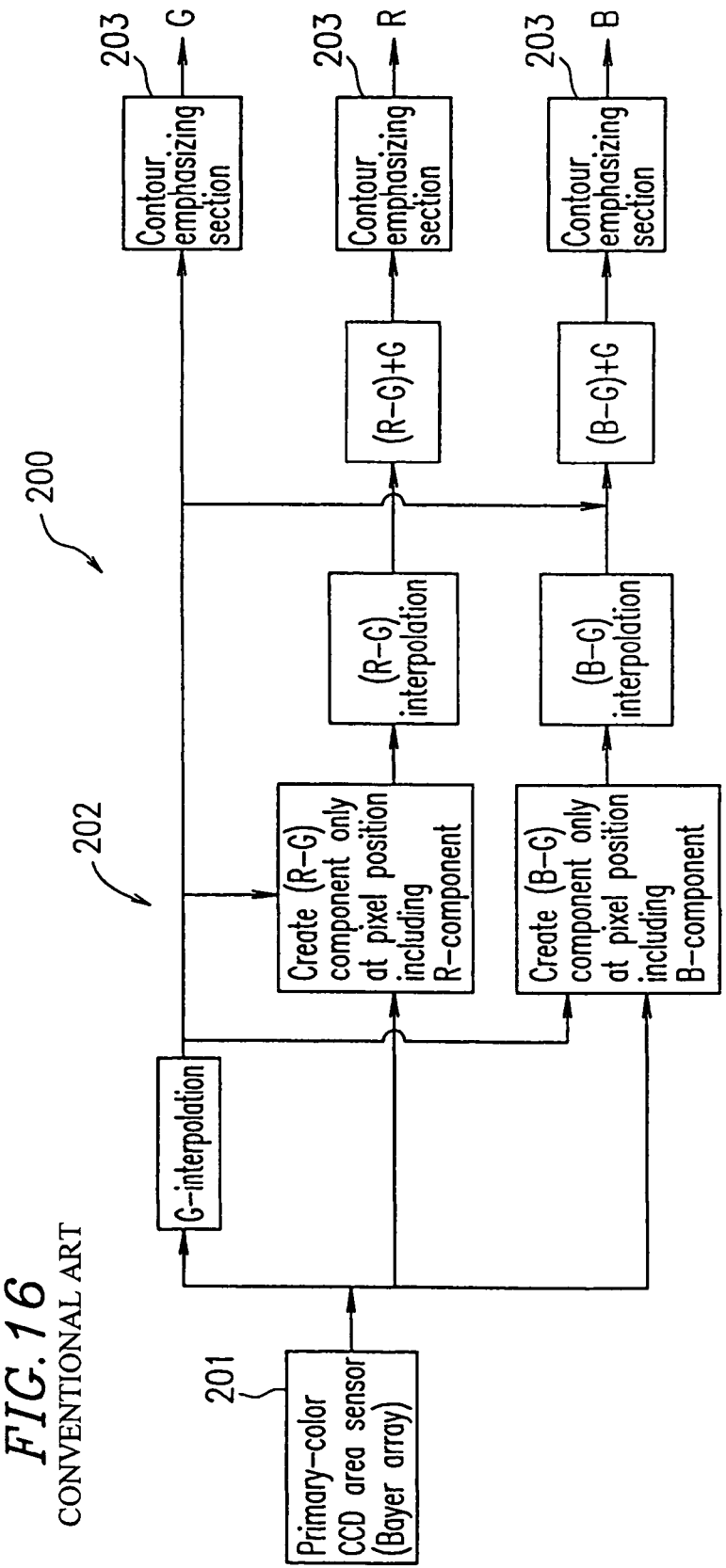
FIG. 16 is a block diagram showing a second exemplary structure of a conventional image processing apparatus.

The primary-color CCD area sensor 3 is formed by a plurality of light-receiving elements arranged in a matrix. The primary-color CCD area sensor 3 includes a color filter on a light-receiving face thereof. This color filter is formed based on the Bayer array (FIG. 14). It should be noted that RGB image data obtained from the primary-color CCD area sensor 3 successively goes through a Correlated Double Sampling (CDS) circuit (not shown) which reduces noise in the RGB image data, an Automatic Gain Control (AGC) circuit (not shown) for performing gain adjustment processing, and an A/D conversion circuit (not shown) whose resolution is, e.g., 10 bits, and then reaches, as digital image data, the first RGB interpolation section 4 and a second RGB interpolation section (RGB interpolation section for generation of low-frequency luminance signal generation and color-difference signal) 12. (The second RGB interpolation section 12 will be described later in detail.)

In the first RGB interpolation section 4, missing color components among R-, G-, and B-components for each pixel are interpolated based on data from color components of the same type in neighboring pixels. In this example, the R- and B-components are interpolated by a bilinear method represented by expressions (2) through (4), and the G-component is interpolated by a median method represented by expressions (5). The first RGB interpolation section 4 uses, as an RGB interpolation filter, a two-dimensional filter having a size of (an odd-number of pixels)×(an odd-number of pixels) which is greater than 3 pixels×3 pixels.

As the size of this interpolation filter becomes larger, a larger amount of middle- and high-luminance components are reduced by this filter. As a result, it becomes more difficult to extract the middle- and high-luminance components. Interpolation processing would not be achieved by a filter of one-pixel by one-pixel. Furthermore, if a two-dimensional filter of 2 pixels×2 pixels is employed, a bilinear interpolation method cannot be used, and therefore, interpolation cannot be achieved without using a nearest neighbor interpolation. When the nearest neighbor interpolation is used, middle- and high-luminance components are deteriorated as compared with a case where a bilinear interpolation method is used. Thus, a two-dimensional filter of 3 pixels×3 pixels is desirable.

The luminance generation section 5 uses a first RGB image signal which is obtained by the first RGB interpolation section 4 so as to generate a luminance signal Y for extracting middle- and high-luminance components:

$$Y = 0.30R + 0.59G + 0.11B \quad (6)$$

In the middle-high range luminance component extraction section 6, the luminance signal Y which is generated by the luminance generation section 5 is subjected to a first YH extraction filter F1 shown in FIG. 2A and a second YH extraction filter F2 shown in FIG. 2B, whereby middle-high range luminance component YH is extracted. Specifically, the middle-high range luminance component extraction section 6 outputs a difference between an output from the first YH extraction filter F1 having a size of 6 pixels×6 pixels shown in FIG. 2A and an output from the second YH extraction filter F2 having a size of 4 pixels×4 pixels shown in FIG. 2B as middle-high range luminance component YH. In the YH extraction filters 1 and 2, x denotes an operation in a horizontal direction, and y denotes an operation in a vertical direction.

The first YH extraction filter F1 shown in FIG. 2A is a low-path filter having a differential effect (which includes positive and negative coefficients). The first YH extraction filter F1 is symmetric with respect to x- and y-directions, and may have a size of an even-number of pixels along both x- and y-directions (4 pixels×4 pixels, 8 pixels×8 pixels, 10 pixels×10 pixels, etc.). Furthermore, it is desirable that the first YH extraction filter F1 has a square shape (having a size of a same number of pixels along both x- and y-directions). However, the first YH extraction filter F1 may have a horizontally-oblong, rectangular shape where the size in the x-direction is larger than the size in the y-direction if the x-direction of an image is emphasized. Alternatively, the first YH extraction filter F1 may have a vertically-oblong, rectangular shape where the size in the y-direction is larger than the size in the x-direction if the y-direction of an image is emphasized. Furthermore, in the first YH extraction filter F1, coefficients of terms are symmetrically arranged with respect to both x- and y-directions of the filter F1.

The second YH extraction filter F2 shown in FIG. 2B is a low-path filter (which includes only positive coefficients). The second YH extraction filter F2 has a size of an even-number of pixels along both x- and y-directions (but smaller than the size of the filter F1). Furthermore, it is desirable that the second YH extraction filter F2 has a square shape. However, the second YH extraction filter F2 may have a horizontally-oblong, rectangular shape or a vertically-oblong, rectangular shape. Furthermore, in the second YH extraction filter F2, coefficients of terms are symmetrically arranged with respect to both x- and y-directions of the filter F2. With such a symmetrical arrangement of coefficients, an effect of filtering can be uniformly obtained, and as a result, an image can be faithfully reproduced.

Figure 3:
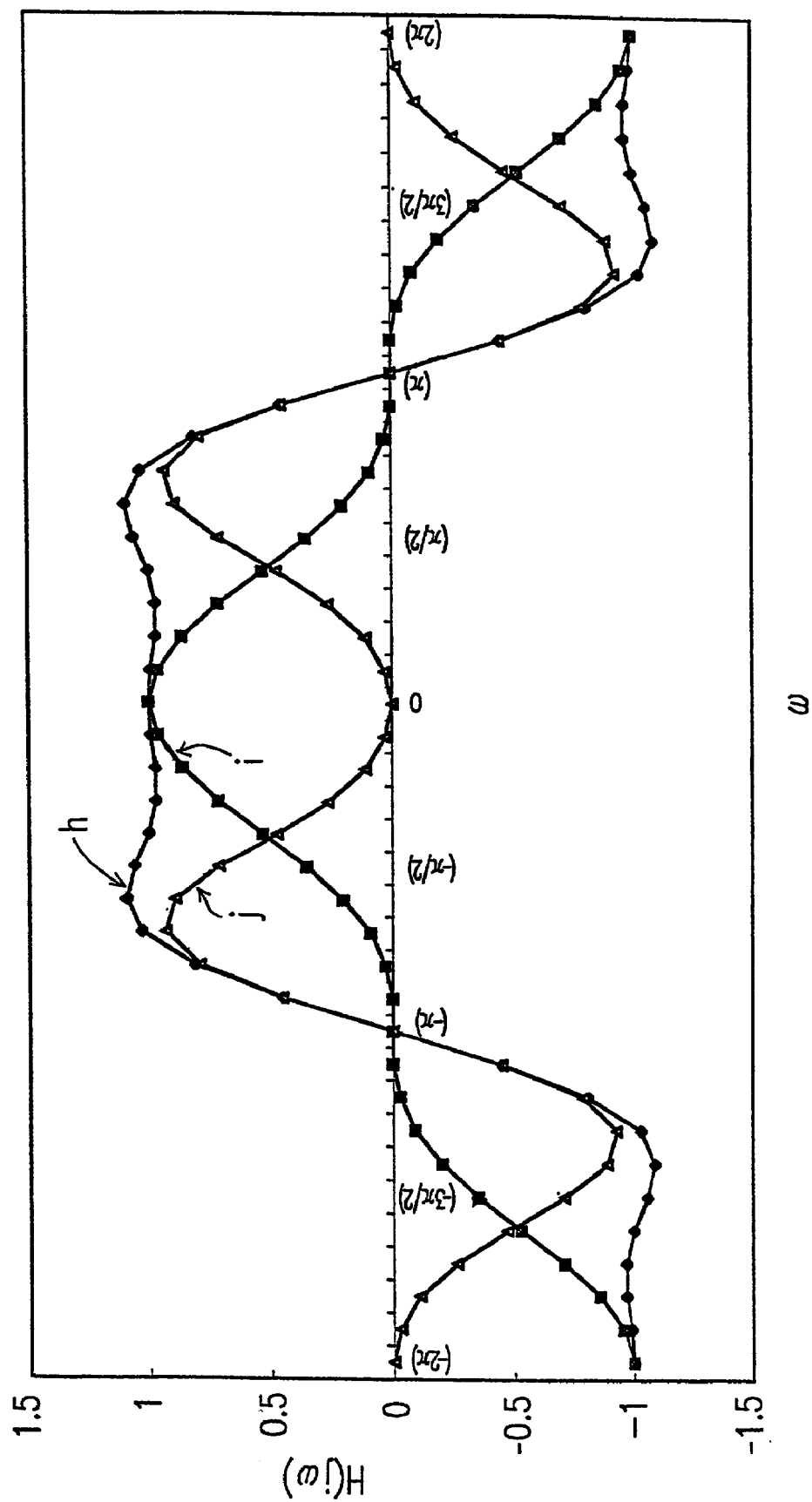
FIG. 3 shows frequency characteristics of the YH extraction filters shown in FIGS. 2A and 2B and a frequency characteristic of a differential output of the YH extraction filters shown in FIGS. 2A and 2B.

With such a YH extraction filter formed by two filters, operations in x- and y-directions can be separately performed. Thus, YH extraction filtering can be readily implemented by hardware. FIG. 3 shows frequency characteristics of the YH extraction filters F1 and F2 (FIGS. 2A and 2B) and a frequency characteristic of a differential output of the filters F1 and F2. In FIG. 3, graph h shows a frequency characteristic of the first YH extraction filter F1, graph i shows a frequency characteristic of the second YH extraction filter F2, and graph j shows a frequency characteristic of middle-high range luminance component YH which is the differential output of graph i and graph j. In this example, the YH extraction filter is formed by two filters, but may be formed by a single filter. In such a case, the arrangement of coefficients of the filter is as shown in FIG. 22, and the amount of arithmetic operations is increased.

The multiplier 7 gives supplemental compensation, by multiplying a gain α which is an adjustment coefficient, to middle-high range luminance component YH which has been extracted by the middle-high range luminance component extraction section 6.

The adder 8 adds a middle-high range luminance component multiplied by a predetermined coefficient of gain α, αYH, to a low-frequency luminance signal YL which is obtained by a low-frequency luminance signal generation section 15 (described later), thereby generating a luminance signal (YL+αYH).

Figure 4:
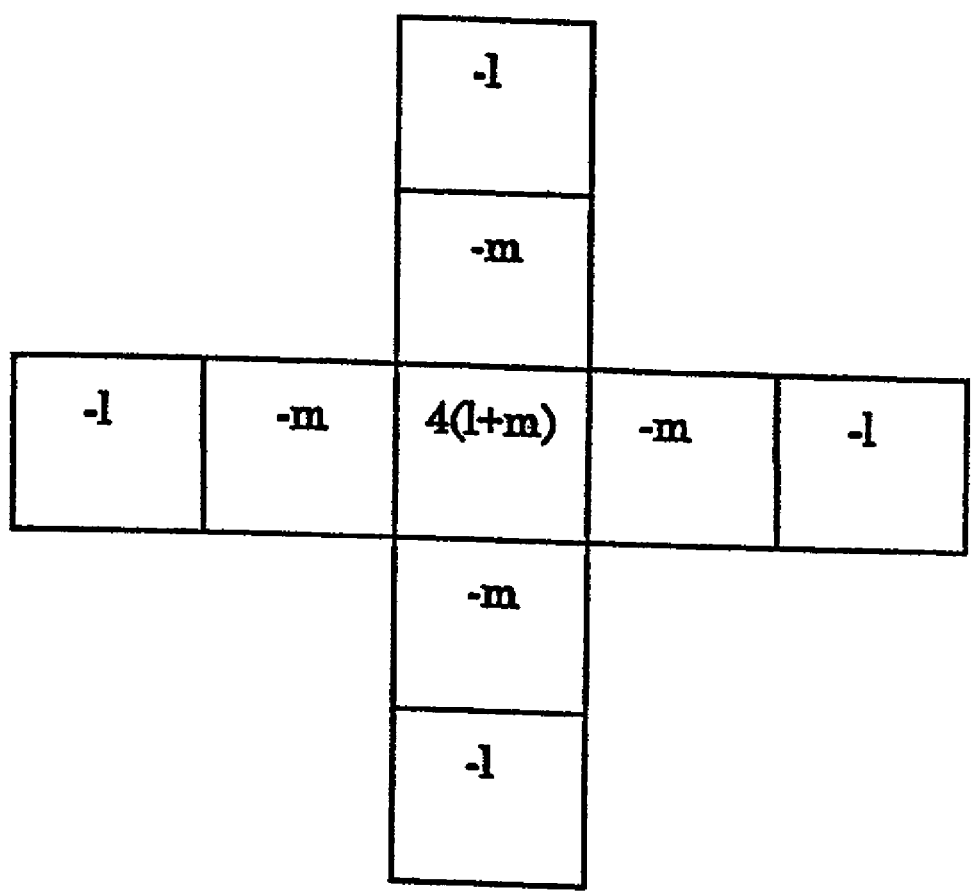
FIG. 4 shows a specific example of a composite contour emphasizing filter used in a middle/high range luminance component extraction section of the image processing apparatus shown in FIG. 1.

In the middle/high-range luminance component extraction section 9, a luminance signal (YL+αYH) received from the adder 8 is subjected to a composite contour emphasizing filter shown in FIG. 4, whereby middle/high-range luminance components ENH are extracted. In the filter of FIG. 4, the ratio of extracted middle-range luminance components and extracted high-range luminance components can be adjusted by adjusting the ratio between variables 1 and m.

The multiplier 10 gives supplemental compensation, by multiplying a gain β which is an adjustment coefficient, to middle- and high-range luminance components ENH which has been extracted by the middle/high-range luminance component extraction section 9.

The adder 11 adds middle- and high-range luminance components multiplied by the multiplier 10 by a predetermined coefficient of gain β, βENH, to a luminance signal (YL+αYH) which is obtained from the adder 8, and outputs a luminance signal (YL+αYH+βENH).

The image processing apparatus 1 further includes: a second RGB interpolation section 12 connected to the primary-color CCD area sensor 3; a white balance adjustment section 13; a gamma correction section 14; a low-frequency luminance signal generation section 15; a color-difference signal generation section 16; and a median filter 17.

In the second RGB interpolation section 12, interpolation is achieved by arithmetic operations using interpolation filters shown in FIGS. 5A and 5B. Color components interpolated by the second RGB interpolation section 12 and color components obtained by the color filter are combined so as to generate a second RGB image signal where all of R-, G-, and B-components are complete for each pixel. Specifically, the R- and B-component interpolation filter shown in FIG. 5A is used for R- and B-components, and the G-component interpolation filter shown in FIG. 5B is used for the G-component. Furthermore, in the G-component interpolation filter, it is required that an operation in the x-direction has priority over an operation in the y-direction.

For example, when R-components are interpolated, only R-components in the Bayer array shown in FIG. 14 are input to the R- and B-component interpolation filter in FIG. 5A, and zero is input for B- and G-components to the R- and B-component interpolation filter. As a result, an output from the R- and B-component interpolation filter results in an interpolated R-component image. In the R- and B-component interpolation filter shown in FIG. 5A, the order of arithmetic operations is not important because a weighting coefficient is the same for both the x- and y-directions. However, in the G-component interpolation filter shown in FIG. 5B, an operation in the x-direction must be performed prior to an operation in the y-direction because a weighting coefficient for the x-direction is different from that for the y-direction. If an operation in the y-direction must be performed prior to an operation in the x-direction, weighting coefficients for the x- and y-directions shown in the G-interpolation filter of FIG. 5B are replaced with each other. Each of the interpolation filters shown in FIGS. 5A and 5B is a low-path filter (which includes only positive coefficients). Each of these filters has a size of an even-number of pixels along both x- and y-directions. Furthermore, in each of these filters, coefficients of terms are symmetrically arranged with respect to both x- and y-directions of the filter. With such a symmetrical arrangement of coefficients, an effect of filtering can be uniformly obtained, and as a result, an image can be faithfully reproduced.

In the second RGB interpolation section 12, filters having a size of an even-number of pixels are employed because at the adder 8 where middle-high range luminance component YH is added to a low-frequency luminance signal YL, a position of image data from the section 15 must conform to that of image data from the multiplier 7. Specifically, as described above, since the YH extraction filter of the middle-high range luminance component extraction section 6 must have a size of an even-number of pixels whereas the interpolation filter used in the first RGB interpolation section 4 has a size of an odd-number of pixels, image data of the extracted middle-high range luminance component YH reside in positions between pixels. Therefore, new pixels must be created on boundaries between pixels in pixel data of the low-frequency luminance signal YL, and to this end, a filter having a size of an even-number of pixels is used in the second RGB interpolation section 12. In such an arrangement, pixel data of the low-frequency luminance signal YL is positioned between pixels so as to conform to a position of image data of the extracted middle-high range luminance component YH.

The white balance adjustment section 13 adjusts the white balance with respect to the interpolated R-, G-, or B-components in each pixel according to the color temperature of light so as to correct the color of an image.

The gamma correction section 14 processes the R-, G-, and B-components obtained after the white balance has been adjusted such that the R-, G-, and B-components conform to properties of a display or printer for outputting an image.

The low-frequency luminance signal generation section 15 generates a low-frequency luminance signal YL based on above expression (6) after gamma correction.

The color-difference signal generation section 16 generates color-difference signals Cr and Cb based on expressions (7) after gamma correction:

$$Cr = 0.70R - 0.59G - 0.11B$$

$$Cb = -0.30R - 0.59G + 0.89B \qquad (7)$$

The median filter 17 removes noise from the above color-difference signals Cr and Cb. The size of the median filter 17 depends on the quality of a CCD. That is, for example, a median filter having a size of 5 pixels×5 pixels is used for a CCD which causes much noise, and a median filter having a size of 3 pixels×3 pixels is used for a CCD which causes small noise.

Hereinafter, a principle of the present invention will be described in detail.

Figure 21:
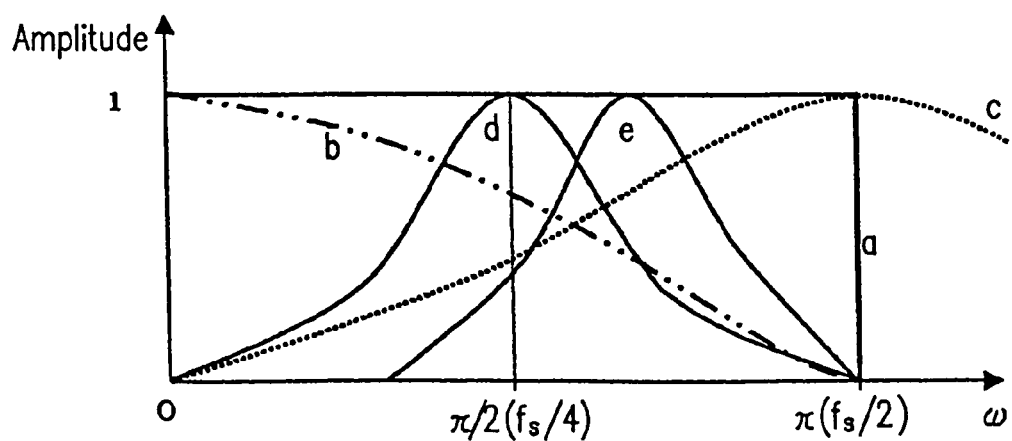
FIG. 21 shows frequency characteristics of a middle-range luminance component, a middle-high range luminance component, and a high-range luminance component compensation filter.

As described above, when a high-range luminance component is emphasized by a compensation filter having a frequency characteristic represented by graph c shown in FIG. 21, frequency components having a frequency higher than ½ of a sampling frequency fs are undesirably emphasized as well, whereby jaggy is caused. In order to remove such jaggy, according to the present invention, a middle-high range component represented by graph e of FIG. 21 is mainly compensated for, and middle- and high-range components of an image are supplementarily compensated for. As shown by graph e of FIG. 21, the middle-high range component has a maximum value of its amplitude at a position where the angular frequency ω is between π/2 to π, and the amplitude thereof is zero when the angular frequency ω is π.

For the purpose of simplifying the description, a one-dimensional filter is used instead of a two-dimensional filter in an example illustrated below. A filter which can extract the middle-high luminance component is a filter (A) shown in FIG. 6. The transfer function of the filter (A) of FIG. 6 having a size of an even-number of pixels is as shown in expression (8). It should be noted that a center of the filter (A) of FIG. 6 having a size of an even-number of pixels is present at an intermediate position between pixels, and a position of a filter output is also present at an intermediate position between pixels. The reason that a filter having a size of an even-number of pixels is used is to obtain a frequency characteristic represented by graph e of FIG. 21. In the filter (A) of FIG. 6, the number shown in each box represents a "weight" of a pixel corresponding to the box.

$$H(z) = -Z^{-1.5} + Z^{-0.5} + Z^{0.5} - Z^{1.5} \qquad (8)$$

$$= 2\cos(0.5\omega) - 2\cos(1.5\omega)$$

where $z = e^{j\omega} = \cos\omega + j\sin\omega$

Figure 17A:
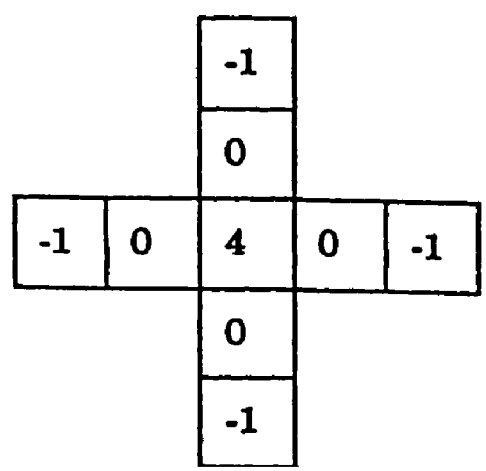
FIGS. 17A and 17B show two-dimensional second-derivative filters which are used in contour emphasizing processing.
Figure 17B:
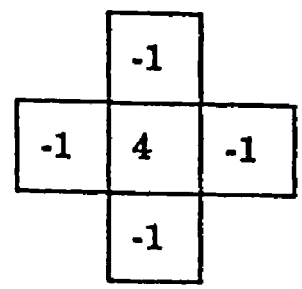
Figure 18:
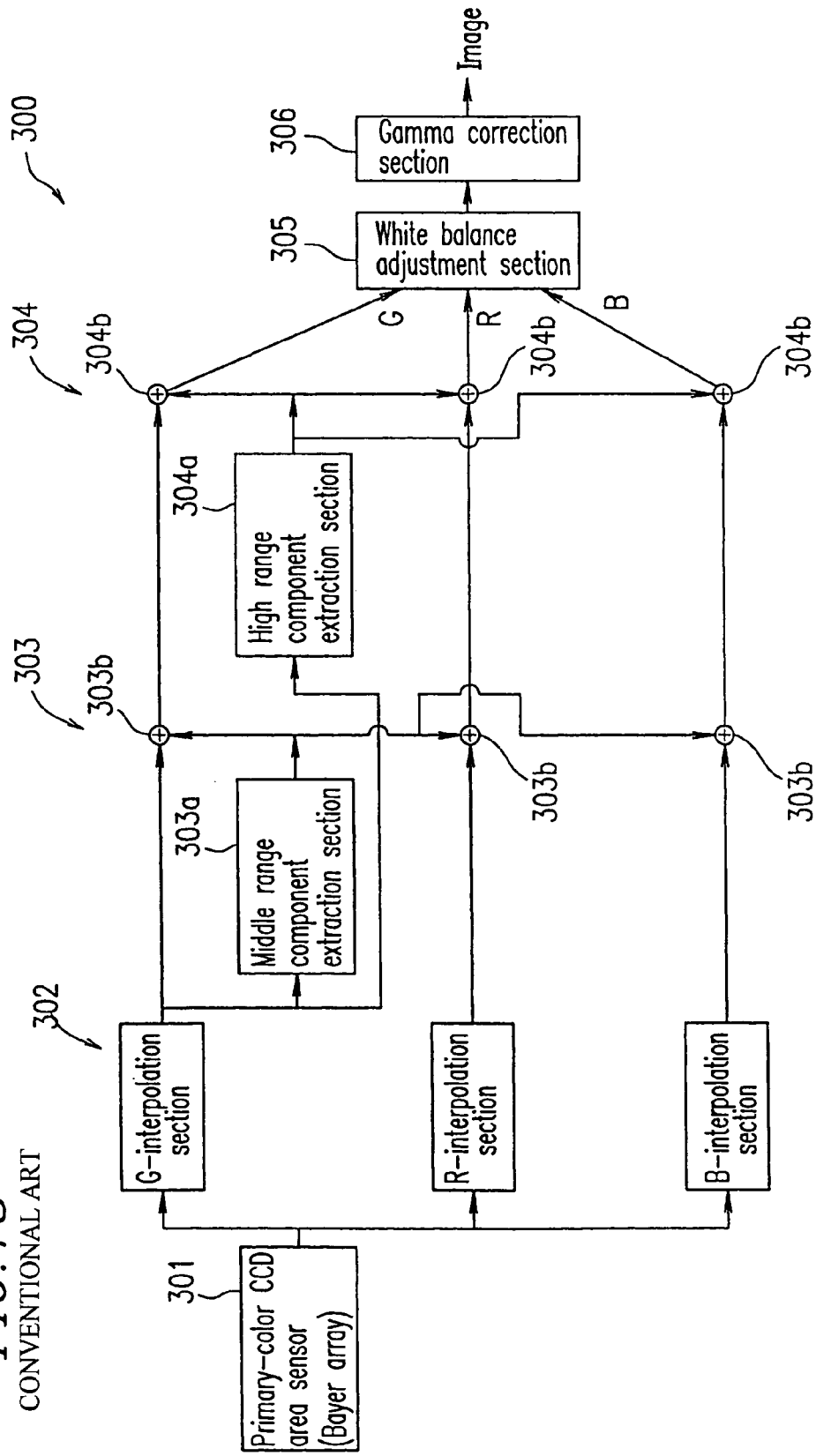
FIG. 18 is a block diagram showing a third exemplary structure of a conventional image processing apparatus.
Figure 19:
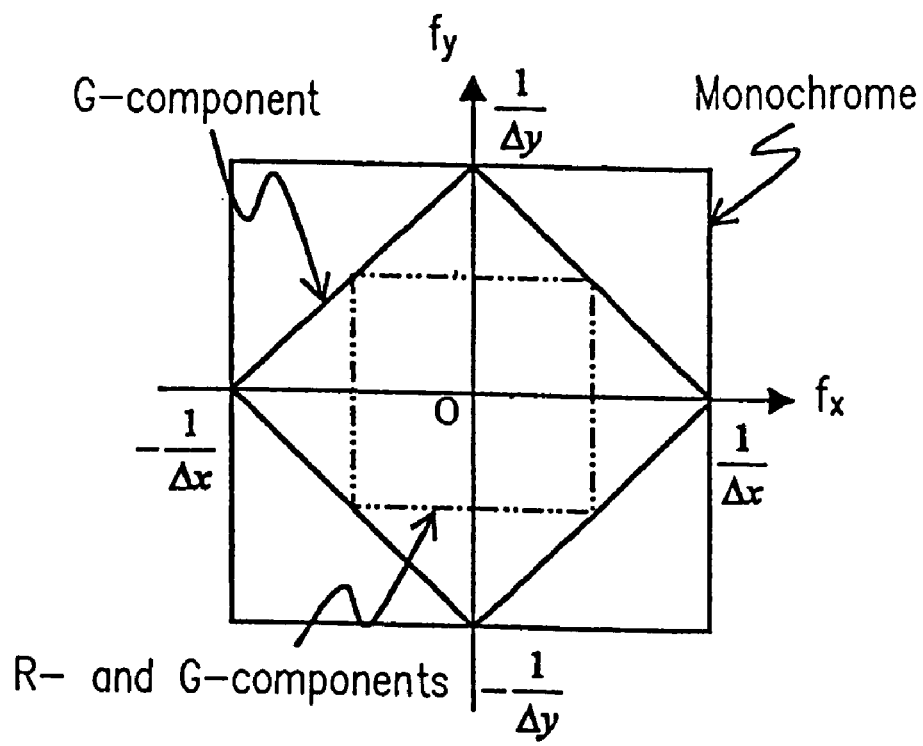
FIG. 19 shows a restorable range of sampling frequencies for each color component in the Bayer array.

For the purpose of comparing the filter (A) with a middle-range luminance component compensation filter and a high-range luminance component compensation filter which are used in a conventional technique, the two-dimensional second-derivative filter of FIG. 17B is converted into a one-dimensional filter to prepare a filter (B) of FIG. 6, and the two-dimensional second-derivative filter of FIG. 17A is converted into a one-dimensional filter to prepare a filter (C) of FIG. 6. The transfer function of the filter (B) of FIG. 6 is as shown in expression (9), and the transfer function of the filter (C) of FIG. 6 is as shown in expression (10):

$$H(z) = -Z^{-1} + 2Z^0 - Z^1 \qquad (9)$$

$$= 2 - 2\cos(\omega)$$

$$H(z) = -Z^{-2} + 2Z^0 - Z^2 \qquad (10)$$

$$= 2 - 2\cos(2\omega)$$

Figure 7:
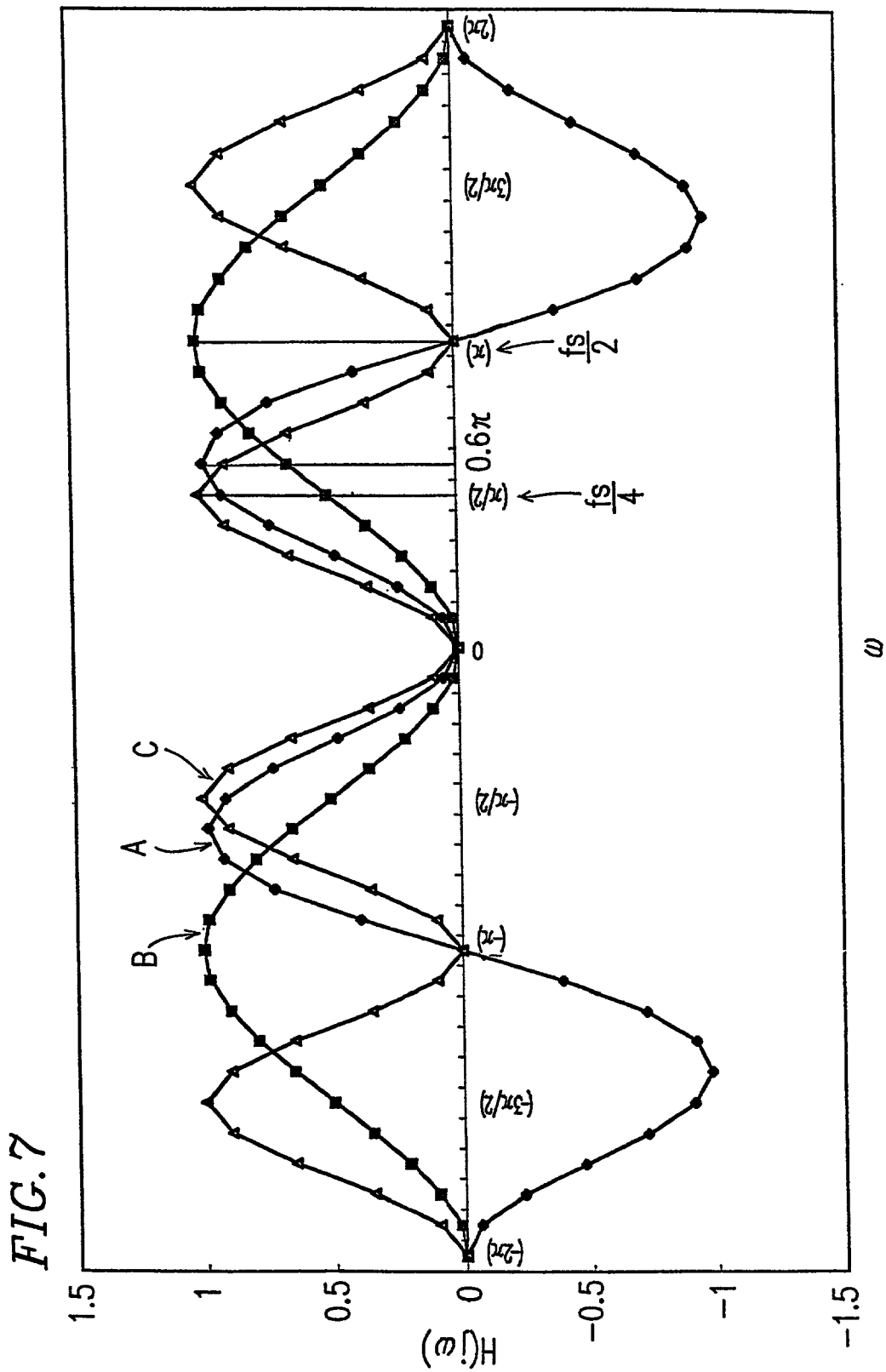
FIG. 7 shows frequency characteristics of filter A having a size of an even-number of pixels and filters B and C each having a size of an odd-number of pixels.

The transfer functions represented by expressions (8), (9), and (10) are normalized, and frequency characteristics thereof are shown in graphs A, B, and C, respectively, in FIG. 7. The frequency characteristic of expression (8) shown in graph A exhibits a maximum value of the amplitude when the angular frequency ω is 0.6π, and exhibits an amplitude of zero when the angular frequency ω is π. Thus, the compensation with middle-high luminance component can be achieved.

Figure 8:
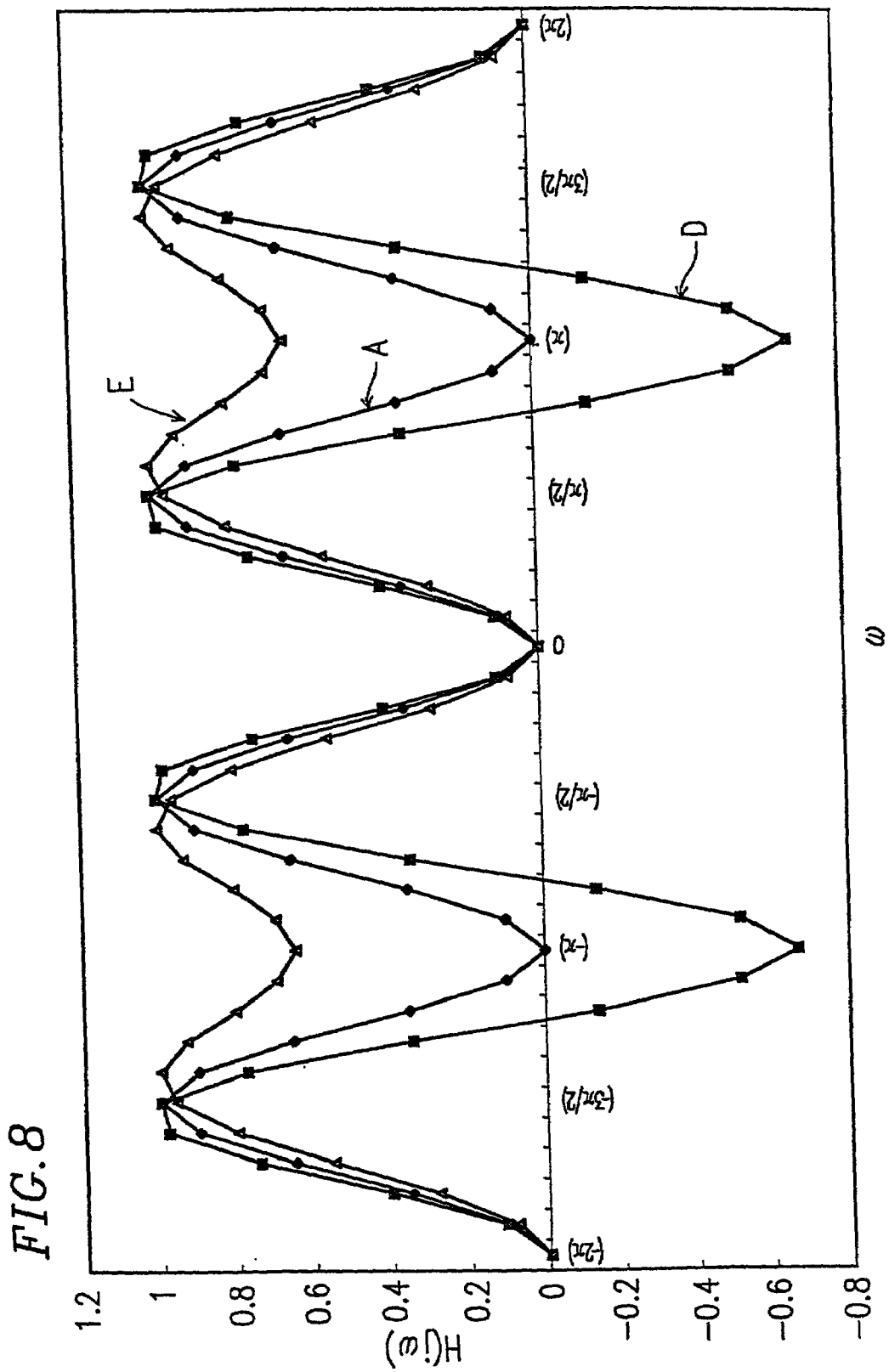
FIG. 8 shows frequency characteristics of filter A having a size of an even-number of pixels and filters D and E each having a size of an odd-number of pixels.

In the case of using a filter having a size of an odd-number of pixels where a value (amplitude) of its transfer function is zero when the angular frequency ω is π, the amplitude thereof reaches a maximum value only when the angular frequency ω is π/2 (equivalent to fs/4). For example, referring to FIG. 8 which shows frequency characteristics of the filters (A), (D), and (E) of FIG. 6, the amplitude of the frequency characteristic for each of the filters (D) and (E), i.e., a filter having a size of an odd-number of pixels, is not zero when the angular frequency ω is π. Thus, a filter having a size of an odd-number of pixels causes noise or jaggy in a reproduced image as in a conventional technique.

Thus, for the purpose of compensating for a high-range component without emphasizing noise or jaggy, it is necessary to use a filter having a size of an even-number of pixels, such as the filter (A) of FIG. 6. A filter (F) of FIG. 6 has a size of an even-number of pixels which is obtained by adding a high-order derivative term to the filter (A). The transfer function of the filter (F) is as shown in expression (11):

$$H(z) = Z^{-2.5} - 5Z^{-1.5} + 4Z^{-0.5} + 4Z^{0.5} - 5Z^{1.5} + Z^{2.5} \quad (11)$$
$$= 8\cos(0.5\omega) - 10\cos(1.5\omega) + 2\cos(2.5\omega)$$

Figure 9:
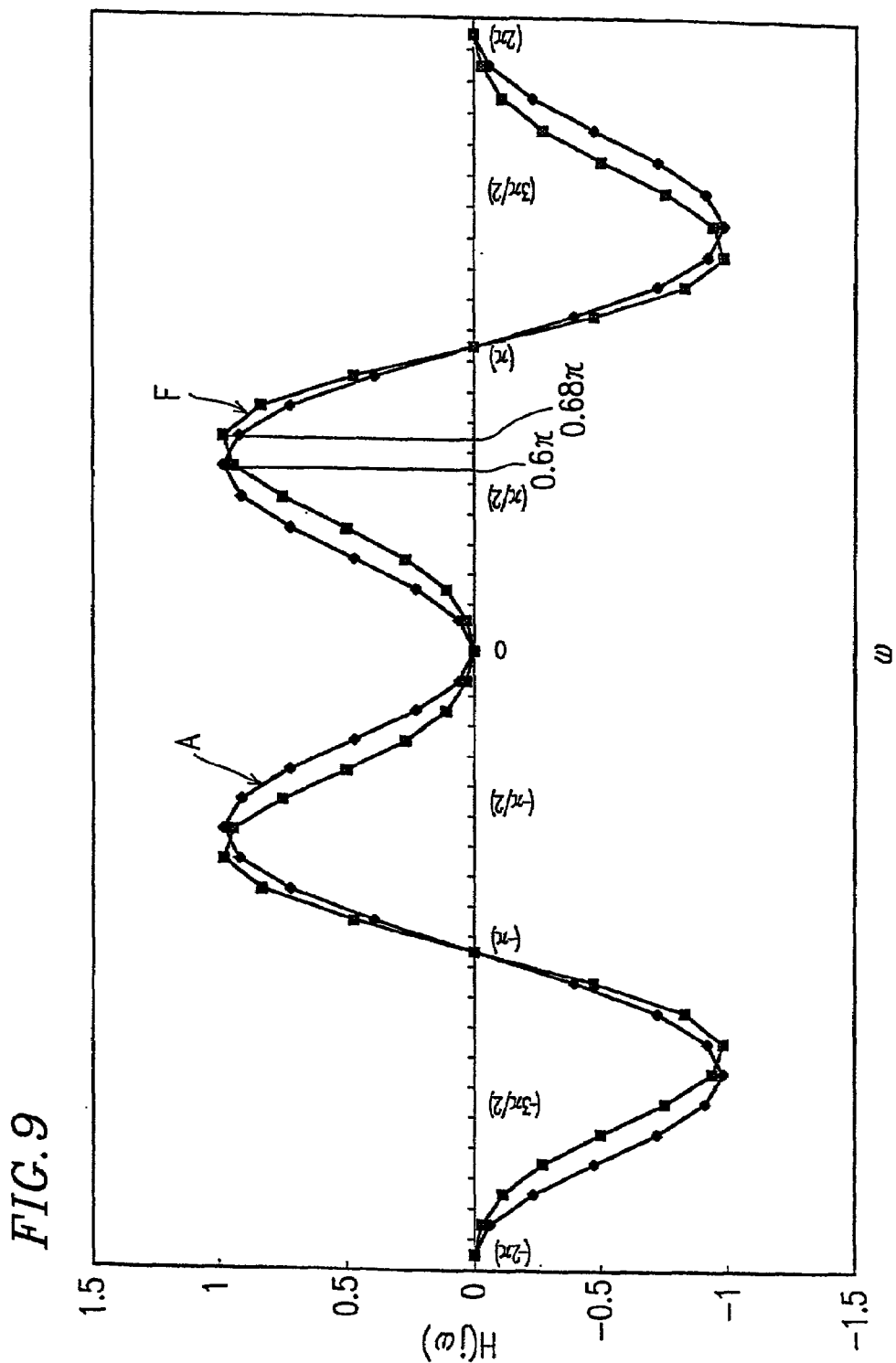
FIG. 9 shows frequency characteristics of various filters each having a different size of an even-number of pixels.

Referring to FIG. 9, the frequency characteristic of a normalized transfer function (8) (filter (A) of FIG. 6) is represented by graph A, and the frequency characteristic of a normalized transfer function (11) (filter (F) of FIG. 6) is represented by graph F. Graph A exhibits a peak of amplitude at a position where $\omega=0.6\pi$, and graph F exhibits a peak of amplitude at a position where $\omega=0.687\pi$. In both of graph A and graph F, the amplitude is zero at a position where $\omega=\pi$. Thus, both of the filter (A) and filter (F) can be used to compensate for a middle-high range luminance component. However, the filter (F) is more useful than the filter (A) because, when graph A (filter (A)) and graph F (filter (F)) exhibit the maximum amplitude, the angular frequency ω for graph F is larger than that for graph A. In other words, by using a filter which exhibits the amplitude of zero at a position where $\omega=\pi$, frequency components having a frequency higher than fs/2 can be prevented from causing noise. Furthermore, within a angular frequency range of $\pi/2$ to $\pi$, as a value of angular frequency (oat which the frequency characteristic exhibits a maximum value of amplitude becomes closer to $\pi$, a higher-range luminance component can be compensated for.

Figure 10:
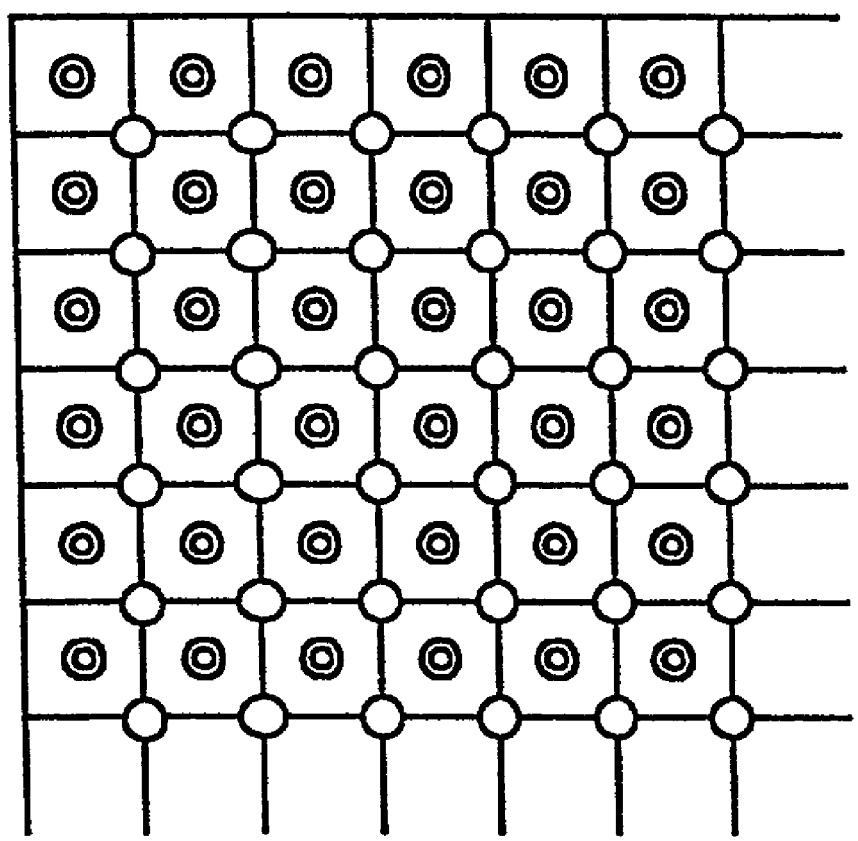
FIG. 10 illustrates a case where pixel data is generated between neighboring pixels with a filter having a size of an even-number of pixels.

Furthermore, using a filter having a size of an even-number of pixels means that new pixels are created, not at original pixel positions of a CCD, but at positions on borders between original pixels. Thus, a two-dimensionally arranged filter has an arrangement shown in FIG. 10. In FIG. 10, symbols "⊙" denote original pixel positions of the CCD, and symbols "○" denote pixel data positions after a filter having a size of an even-number of pixels has been applied.

For the purpose of examining an operation of an image processing apparatus of the present invention, the frequency characteristic as to luminance signal processing when a one-dimensional filter is used is now described. Referring to FIG. 1, the description is made while referring to a series of processing shown in FIG. 1 since the primary-color CCD area sensor 3 outputs image data until a luminance signal (YL+αYH) is obtained by the adder 8. Each process in the luminance generation section 5, the white balance adjustment section 13, the gamma correction section 14, and the low-frequency luminance signal generation section 15 does not influence a frequency distribution of image data, and therefore, descriptions thereof are herein omitted.

In the first RGB interpolation section 4, R- and B-components are interpolated by using a bilinear method of expressions (2) through (4), and a G-component is interpolated by using a median method of expression (5). With such interpolation processing, a middle-high range component is attenuated, but is not completely removed.

The middle-high range luminance component extraction section 6 uses the YH interpolation filters shown in FIGS. 2A and 2B to extract a middle-high range luminance component YH. The extracted middle-high range luminance component YH can be freely adjusted by using gain α. It should be noted that, for the purpose of simplifying the description, a loss of the middle-high range luminance component YH in the first RGB interpolation section 4 is not considered.

The two-dimensional filters for extracting a middle-high range luminance component (first and second YH extraction filters F1 and F2 shown in FIGS. 2A and 2B) correspond to the one-dimensional filter (F) of FIG. 6, the transfer function of the filter (F) is represented by expression (11).

The second RGB interpolation section 12 uses, as a RGB interpolation filter, two-dimensional filters shown in FIGS. 5A and 5B. The two-dimensional filters shown in FIGS. 5A and 5B correspond to a one-dimensional filter (G) of FIG. 6, the transfer function of the filter (G) is represented by expression (12):

$$H(j\omega)=Z^{-1.5}+3Z^{-0.5}+3Z^{0.5}+Z^{1.5} \quad (12)$$

Figure 11:
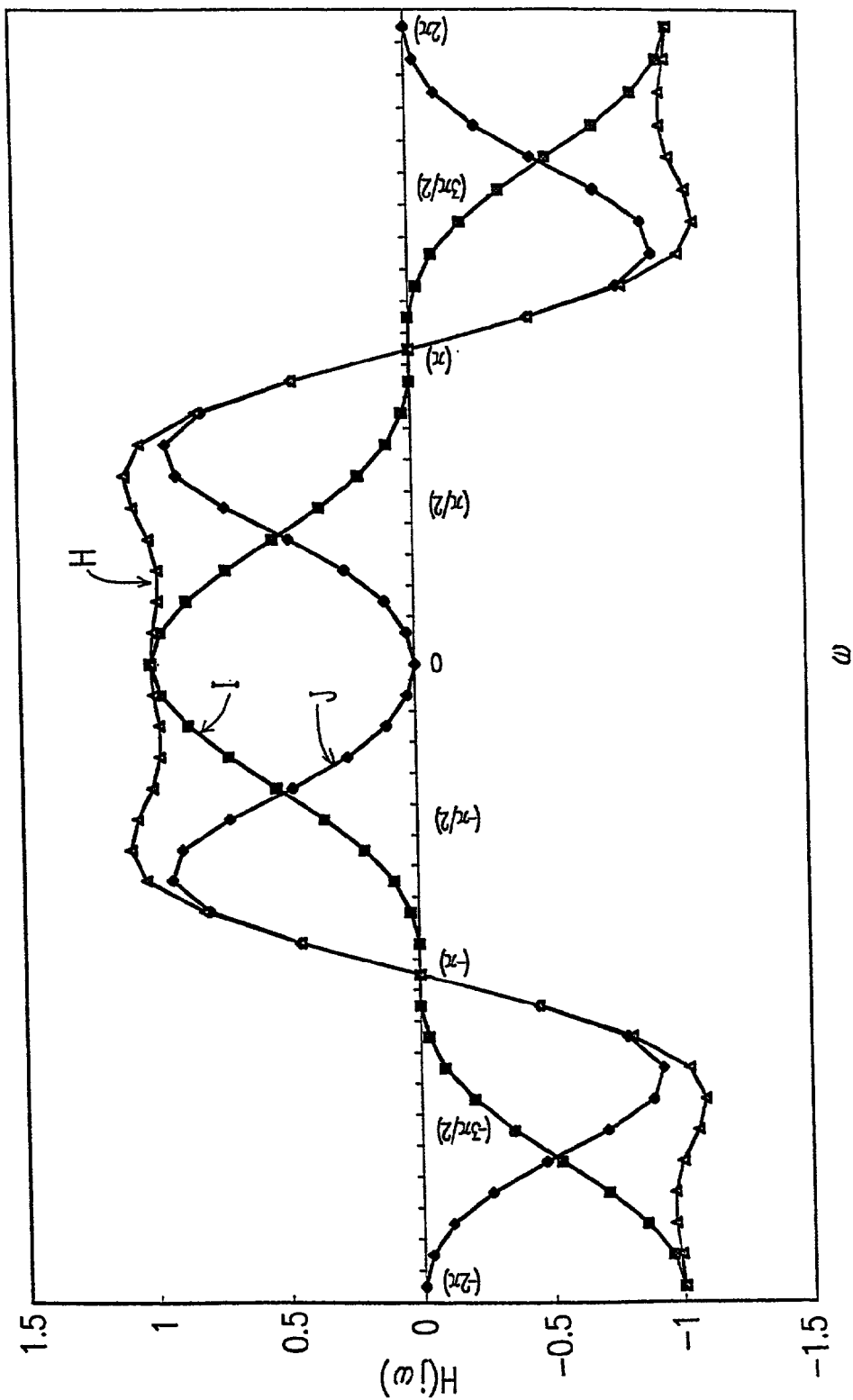
FIG. 11 shows frequency characteristics of a low-frequency luminance signal, a middle-high luminance component, and a low-frequency luminance signal including a compensated middle-high luminance component.

In FIG. 11, the frequency characteristic of expression (11) of the YH extraction filter is represented by graph J, and the frequency characteristic of expression (12) of the RGB interpolation filter which is used in the second RGB interpolation section 12 is represented by graph I. (It should be noted that FIG. 11 shows the normalized functions.) The frequency characteristic of a luminance signal (YL+YH) is represented by graph H. From FIG. 11, it is clearly understood that the middle-high range luminance component YH has been compensated for.

Figure 12:
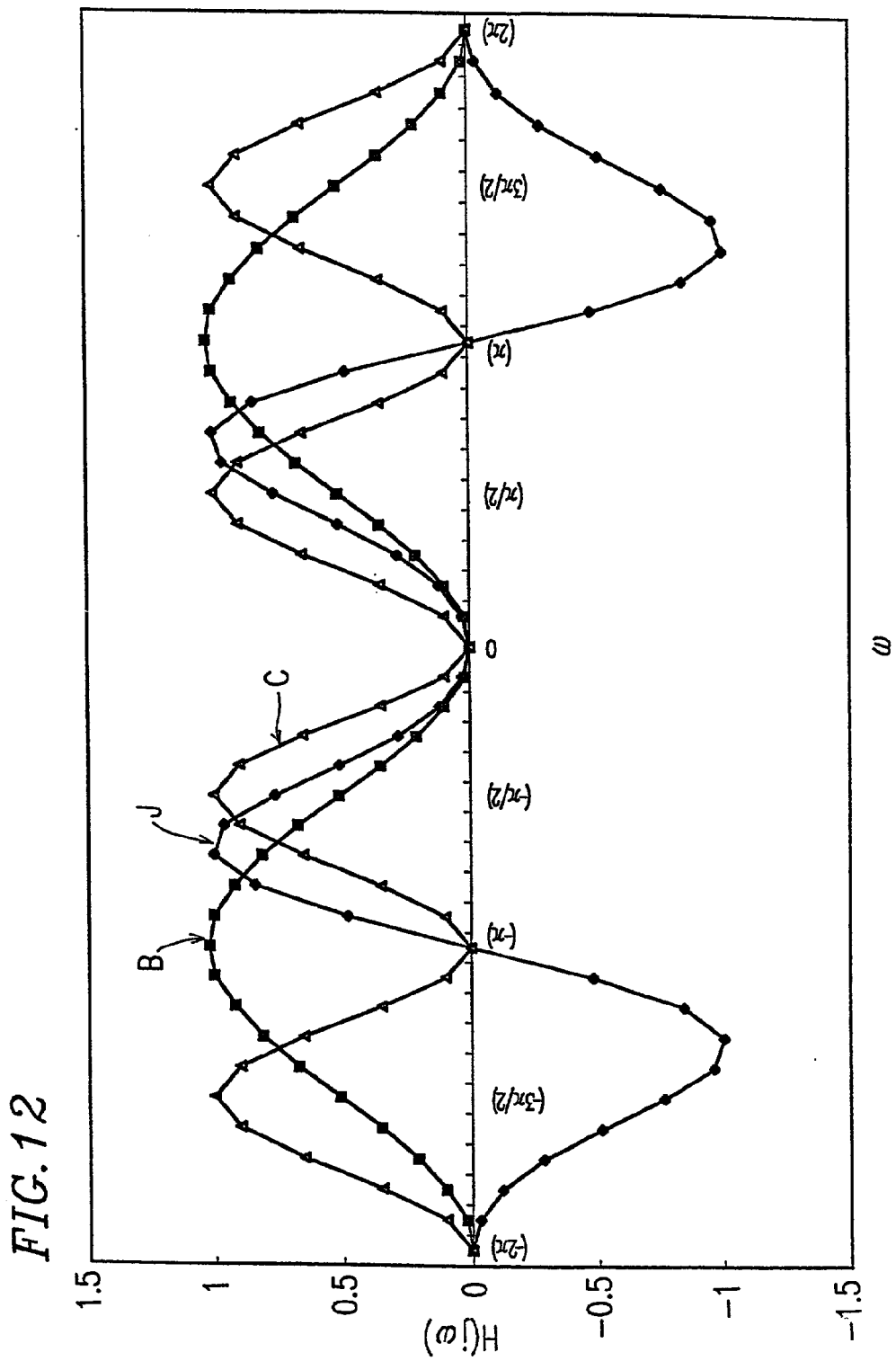
FIG. 12 shows frequency characteristics of a middle-high range luminance component extraction filter, a middle-range luminance component extraction filter, and a high-range luminance component extraction filter.
Figure 13:
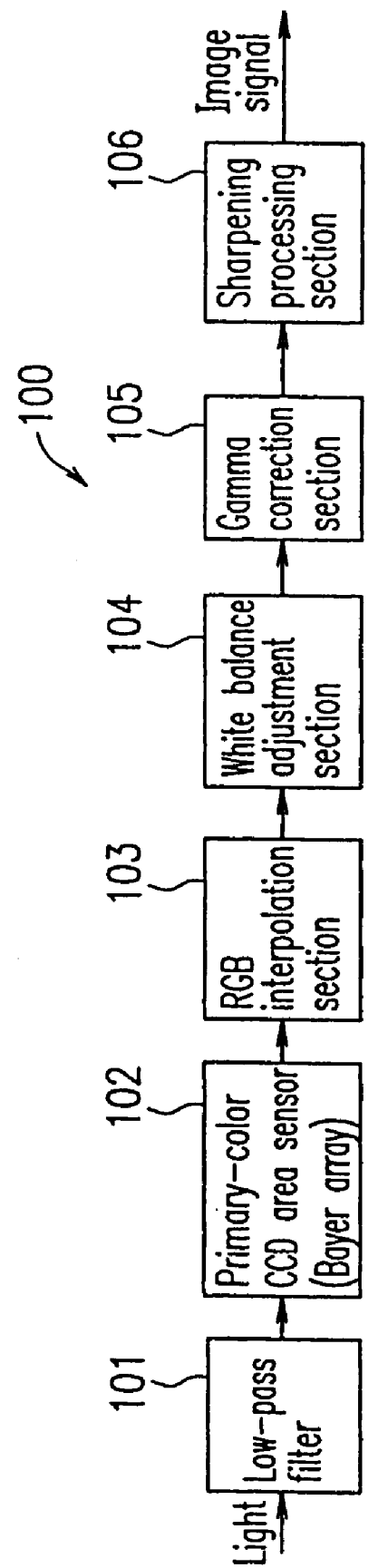
FIG. 13 is a block diagram showing a first exemplary structure of a conventional image processing apparatus.
Figure 20:
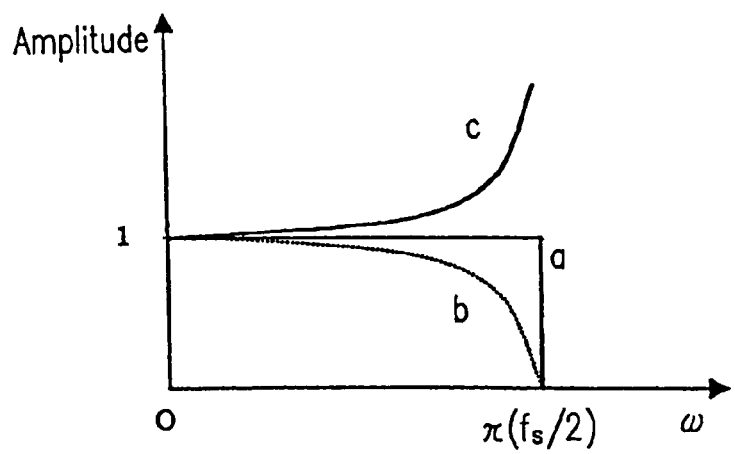
FIG. 20 shows frequency characteristics of an optical low-pass filter and a compensation filter.

Compensation of a middle-range luminance component and a high-range luminance component is supplementarily carried out by using the two filters shown in FIGS. 17A and 17B. For comparison, FIG. 12 shows again the frequency characteristic of transfer function (11) of the YH extraction filters shown in FIGS. 2A and 2B which is in the form of a one-dimensional function, and the frequency characteristics of transfer functions (9) and (10) of the two two-dimensional second-derivative filters shown in FIGS. 17A and 17B which are in the form of a one-dimensional function. In FIG. 12, graph J shows the frequency characteristic of filter (F) of FIG. 6 which is represented by expression (11), graph B shows the frequency characteristic of the high-range luminance component extraction filter shown in FIG. 17B, and graph C shows the frequency characteristic of the middle-range luminance component extraction filter shown in FIG. 17A. Considering influence of the optical low-pass filter 2 (FIG. 20), a middle-range luminance component and a high-range luminance component in graph H show in FIG. 11 can be compensated for by utilizing the frequency characteristics of graph B and graph C show in FIG. 12. With only compensation with middle-high range component YH, a frequency characteristic cannot be compensated so as to be identical with the ideal characteristic represented by graph C of FIG. 20. However, by adjusting parameters 1 and m of the composite contour emphasizing filter shown in FIG. 4, gain α and ENH gain β, a frequency characteristic which is closer to the ideal characteristic represented by graph C can be obtained.

As described hereinabove, according to this embodiment of the present invention, as shown in FIG. 1, an image processing system includes a middle-high range luminance component YH generation route including the first RGB interpolation section 4 and the middle-high range luminance component extraction section 6 in parallel with a low-frequency luminance signal YL generation route including the second RGB interpolation section 12, and the middle-high range luminance component YH is added by the adder 8 to low-frequency luminance signal YL, whereby a middle-high range luminance component is compensated for by the middle-high range luminance component YH. Furthermore, a middle-range luminance component and a high-range luminance component are supplementarily compensated for by using a conventional compensation method. Thus, an image with higher resolution can be obtained as compared with an image obtained by a conventional image processing system, while noise and jaggy can be prevented from appearing in a reproduced image.

According to this embodiment of the present invention, in order to prevent occurrence of false color, a color-difference signal is generated from a second RGB image signal which is generated by interpolation with a low-pass filter in the second RGB interpolation section 12 (FIG. 1), and then is subjected to the median filter 17 (FIG. 1) before it is externally output. On the other hand, in order to obtain a desirable luminance signal, the middle-high range luminance component YH is added by the adder 8 to low-frequency luminance signal YL, and a middle-range luminance component and high-range luminance component in a resultant signal are supplementarily compensated. When the middle-high range luminance component YH is added to low-frequency luminance signal YL in the adder 8, the position of image data has to be adjusted. As described above, in the middle-high range luminance component extraction section 6, for the purpose of extracting middle-high range luminance component YH, an extraction filter used must be a filter having a size of an even-number of pixels. Accordingly, the first RGB interpolation section 4 has to use, as a RGB interpolation filter, a filter having a size of an odd-number of pixels, especially a filter having a size of 3 pixels×3 pixels, which is the best size in preventing deterioration of middle-high range luminance component YH. Furthermore, the second RGB interpolation section 12 has to use, as a RGB interpolation filter, a filter having a size of an even-number of pixels.

In the present embodiment, the color filter provided to the CCD area sensor is a color filter whose RGB color arrangement based on the Bayer array. However, the RGB color arrangement which can be used in the present invention is not limited to the Bayer array, but any RGB color arrangement may be used.

The above descriptions as to an image processing apparatus of the present invention is now summarized. Referring to FIG. 1, the image processing apparatus 1 processes RGB image data generated by the optical low-pass filter 2 and the area sensor 3. In this image processing, a low-frequency luminance signal generated from the RGB image data has a middle-high range luminance component which is attenuated due to the optical low-pass filter 2 as compared with an ideal frequency characteristic which should be obtained by the optical low-pass filter 2. The image processing apparatus I includes means of compensating for the attenuated middle-high range luminance component of the low-frequency luminance signal. Owing to such compensation means, a sharper image can be obtained by contour emphasizing processing while preventing occurrence of noise and jaggy which may be caused during the contour emphasizing processing.

According to the present invention, a middle-high range luminance component of a low-frequency luminance signal which is attenuated as compared with an ideal frequency characteristic in a range of a predetermined frequency (a ½ of sampling frequency fs) or smaller is compensated. Thus, a sharp image can be obtained by contour emphasizing processing while preventing occurrence of noise and jaggy which may be caused when obtaining the sharp image.

According to the present invention, an image with high resolution can be obtained by contour emphasizing processing while preventing occurrence of noise and jaggy which may be caused when obtaining the sharp image.

According to the present invention, a middle-high range component whose amplitude is zero when the angular frequency $\omega$ is $\pi$ and has a maximum value at a position where the angular frequency $\omega$ is between $\pi/2$ to $\pi$ can be readily extracted.

According to the present invention, a uniform filtering effect can be obtained, and as a result, an image can be faithfully reproduced.

According to the present invention, arithmetic operations in x- and y-directions of image data can be separately performed, and accordingly, increases in the amount of arithmetic operations can be suppressed. Thus, YH extraction filtering can be readily implemented by hardware.

According to the present invention, a middle-high range luminance component can be extracted while most-effectively preventing deterioration of the middle-high range luminance component.

According to the present invention, when compensating for a middle-high range luminance component of a low-frequency luminance signal, a center of the middle-high range luminance component is present at a position between neighboring pixels, and a center of the low-frequency luminance signal is also present at a position between neighboring pixels. Thus, occurrence of a ghost in a reproduced image can be prevented.

According to the present invention, a G-component is interpolated by using a median method, whereby attenuation of a high-range luminance component is suppressed to a minimum level. R- and B-components are interpolated by using a bilinear method, whereby noise is reduced. Thus, a contour of an image is emphasized, and the quality of the image can be improved.

According to the present invention, by changing a ratio between a middle-range luminance component and a high-range luminance component, the three-dimensional appearance (stereoscopic effect or stereophonic effect) of an image can be adjusted according to user's preference.

According to the present invention, a middle/high-range component extraction section can be readily formed of a single filter.

According to the present invention, the amount of noise included in a color-difference signal varies according to, for example, the quality of an image capturing element such as a CCD. Thus, by selecting an appropriate median filter according to the amount of noise, a color-difference signal with reduced noise can be generated.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An image processing apparatus for processing RGB image data output from an image capturing element including a primary-color filter, comprising:
 a low frequency luminance signal generator generating a low frequency luminance signal based on the RGB image data; and
 a middle-high range luminance component compensation section for compensating for a middle-high range luminance component of the low-frequency luminance signal such that the low-frequency luminance signal has substantially an ideal frequency luminance characteristic which is lower than or equal to a predetermined frequency.

2. An image processing apparatus for processing RGB image data output from an image capturing element including a primary-color filter, comprising:
   a low frequency luminance signal generator generating a low frequency luminance signal based on the RGB image data;
   a middle-high range luminance component compensation section for compensating for a middle-high range luminance component of the low-frequency luminance signal, said middle-high range luminance component compensation section including a middle-high range luminance component extracting section for extracting a middle-high range luminance component from the RGB image data, the extracted middle-high range luminance component having a zero amplitude at an angular frequency $\omega=\pi$ and a maximum amplitude at an angular frequency $\omega$ between $\pi/2$ and $\pi$, and
   a synthesis section for adding the extracted middle-high range luminance component to the low frequency luminance signal.

3. The image processing apparatus of claim 2 wherein said middle-high range luminance component extraction section includes at least one filter having a size of an even-number of pixels.

4. The image processing apparatus of claim 3 wherein said at least one filter comprises a two-dimensional filter having coefficients symmetrically arranged with respect to a x-direction and a y-direction.

5. The image processing apparatus of claim 4 wherein said at least one filter includes a first low-pass filter having a differentiation capability and a second low-pass filter and wherein the middle-high range luminance component comprises a difference between an output obtained by arithmetically processing a first luminance signal using the first low-pass filter and an output obtained by arithmetically processing the first luminance signal using the second low-pass filter.

6. The image processing apparatus of claim 5 further comprising:
   a first interpolation section between the primary-color filter and the medium-high range luminance component extraction section for interpolating missing components among R-, G-, and B-components by arithmetically processing the RGB image data using a filter having a size of 3 pixels×3 pixels.

7. The image processing apparatus of claim 6 further comprising:
   a second interpolation section between the primary-color filter and the low frequency luminance signal generator for interpolating missing components among R-, G-, and B-components by arithmetically processing the RGB image data using a filter having a size of an even-number of pixels.

8. The image processing apparatus of claim 7, wherein at least one of the first and second interpolation sections interpolates the RGB image data by using a median method for a G-component and a bilinear method for R- and B-components.

9. The image processing apparatus of claim 7 further comprising:
   a median filtering section, including a median filter, for removing noise inherent to the image capturing element which is contained in a color-difference signal generated based on a RGB image signal from the second interpolation section;
   wherein the median filtering section changes the size of the median filter according to an amount of the noise.

10. The image processing apparatus of claim 3 further comprising:
   a first interpolation section between the primary-color filter and the medium-high range luminance component extraction section for interpolating missing components among R-, G-, and B-components by arithmetically processing the RGB image data using a filter having a size of 3 pixels×3 pixels.

11. The image processing apparatus of claim 3 wherein said at least one filter includes a first low-pass filter having a differentiation capability and a second low-pass filter and wherein the middle-high range luminance component comprises a difference between an output obtained by arithmetically processing a first luminance signal using the first low-pass filter and an output obtained by arithmetically processing the first luminance signal using the second low-pass filter.

12. The image processing apparatus of claim 2 further comprising:
   a first interpolation section between the primary-color filter and the medium-high range luminance component extraction section for interpolating missing components among R-, G-, and B-components by arithmetically processing the RGB image data using a filter having a size of 3 pixels×3 pixels.

13. The image processing apparatus of claim 12 further comprising a second interpolation section between the primary-color filter and the low frequency luminance signal generator for interpolating missing components among R-, G-, and B-components by arithmetically processing the RGB image data using a filter having a size of an even-number of pixels.

14. The image processing apparatus of claim 13, wherein at least one of the first and second interpolation sections interpolates the RGB image data by using a median method for a G-component and a bilinear method for R- and B-components.

15. The image processing apparatus of claim 14 further comprising:
   a median filtering section, including a median filter, for removing noise inherent to the image capturing element which is contained in a color-difference signal generated based on a RGB image signal from the second interpolation section;
   wherein the median filtering section changes the size of the median filter according to an amount of the noise.

16. The image processing apparatus of claim 13 further comprising:
   an interpolation section between the primary-color filter and the low frequency luminance signal generator for interpolating missing components among R-, G-, and B-components by arithmetically processing the RGB image data using a filter having a size of an even-number of pixels.

17. The image processing apparatus of claim 16 further comprising:
   a median filtering section, including a median filter, for removing noise inherent to the image capturing element which is contained in a color-difference signal generated based on a RGB image signal from the second interpolation section;

wherein the median filtering section changes the size of the median filter according to an amount of the noise.

18. The image processing apparatus of claim 2 further comprising:
a middle/high-range luminance component extraction section for extracting at least one of a middle-range luminance component and a high-range luminance component based on the second luminance signal; and
a second synthesis section for adding at least one of the middle-range luminance component and the high-range luminance component to the second luminance signal so as to generate a third luminance signal.

19. An image processing apparatus according to claim 18, wherein the middle/high-range luminance component extraction section arithmetically processes the second luminance signal by using one filter which has an adjustable coefficient.

20. A method of processing RGB image data output from an image capturing element including a primary-color filter comprising the steps of:
generating a first luminance signal from the RGB image data;
generating a second luminance signal having a middle-high range luminance component from the RGB image data; and
correcting the second luminance signal by extracting a middle-high range luminance component from the first luminance signal and adding the extracted middle-high range luminance component to the second luminance signal.

* * * * *